J. M. DENNING.
WIRE FENCE MAKING MACHINE.
APPLICATION FILED SEPT. 16, 1905.
No. 900,490.
Patented Oct. 6, 1908.
17 SHEETS—SHEET 8.
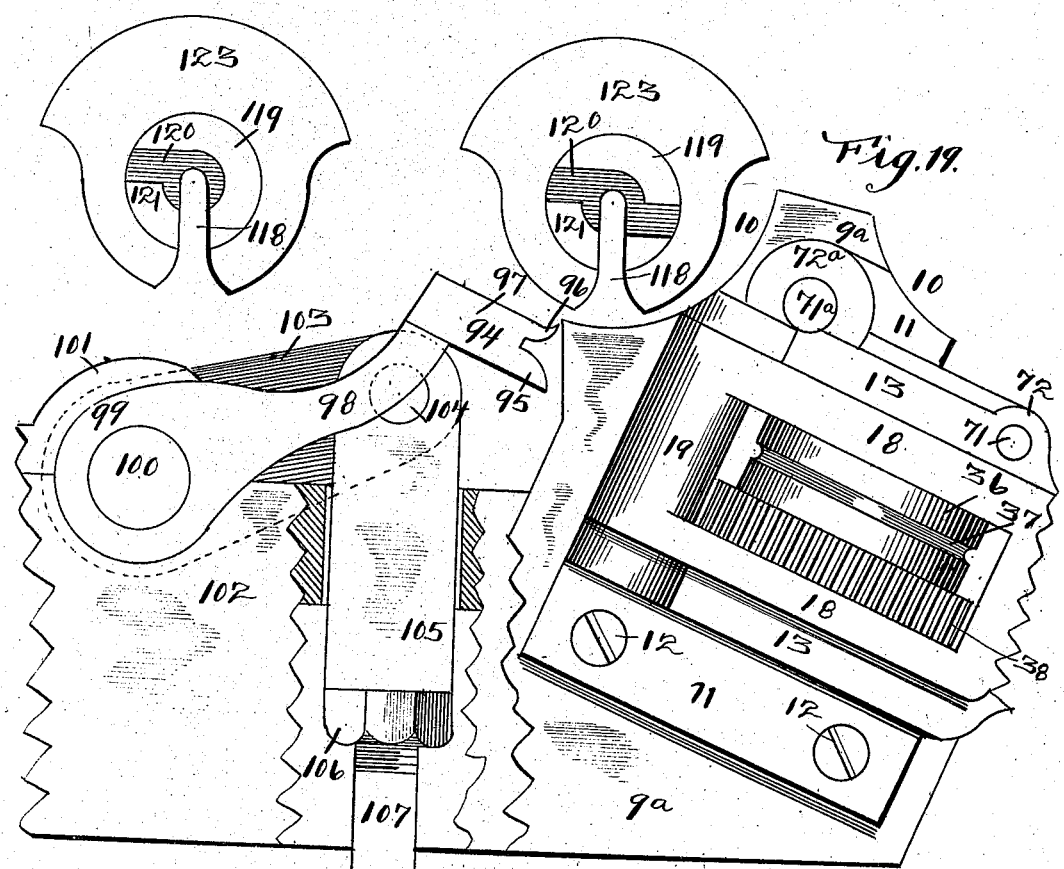
Fig. 19.
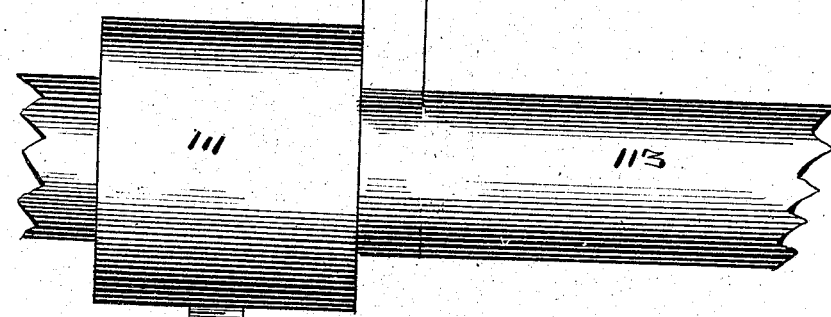

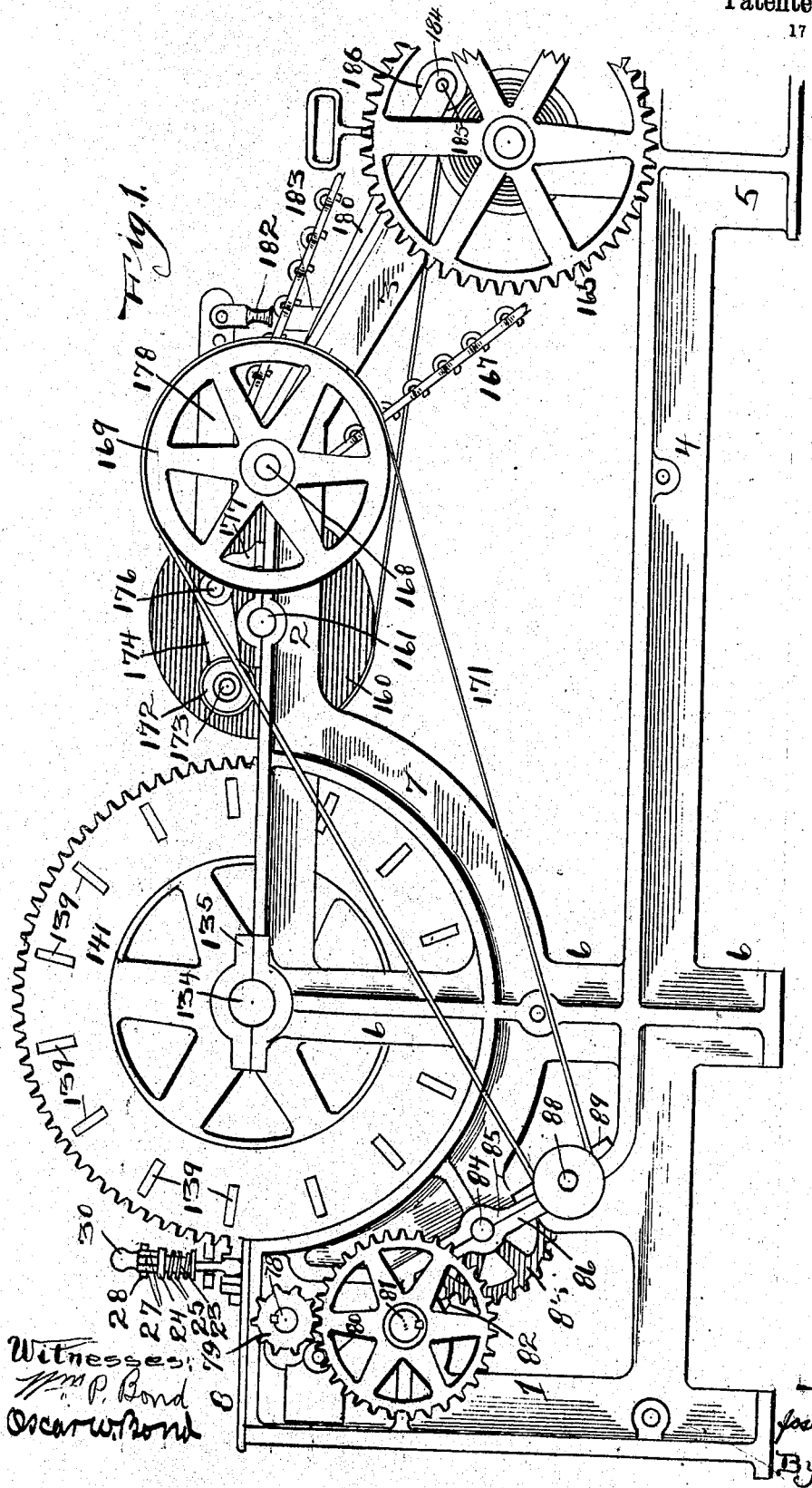

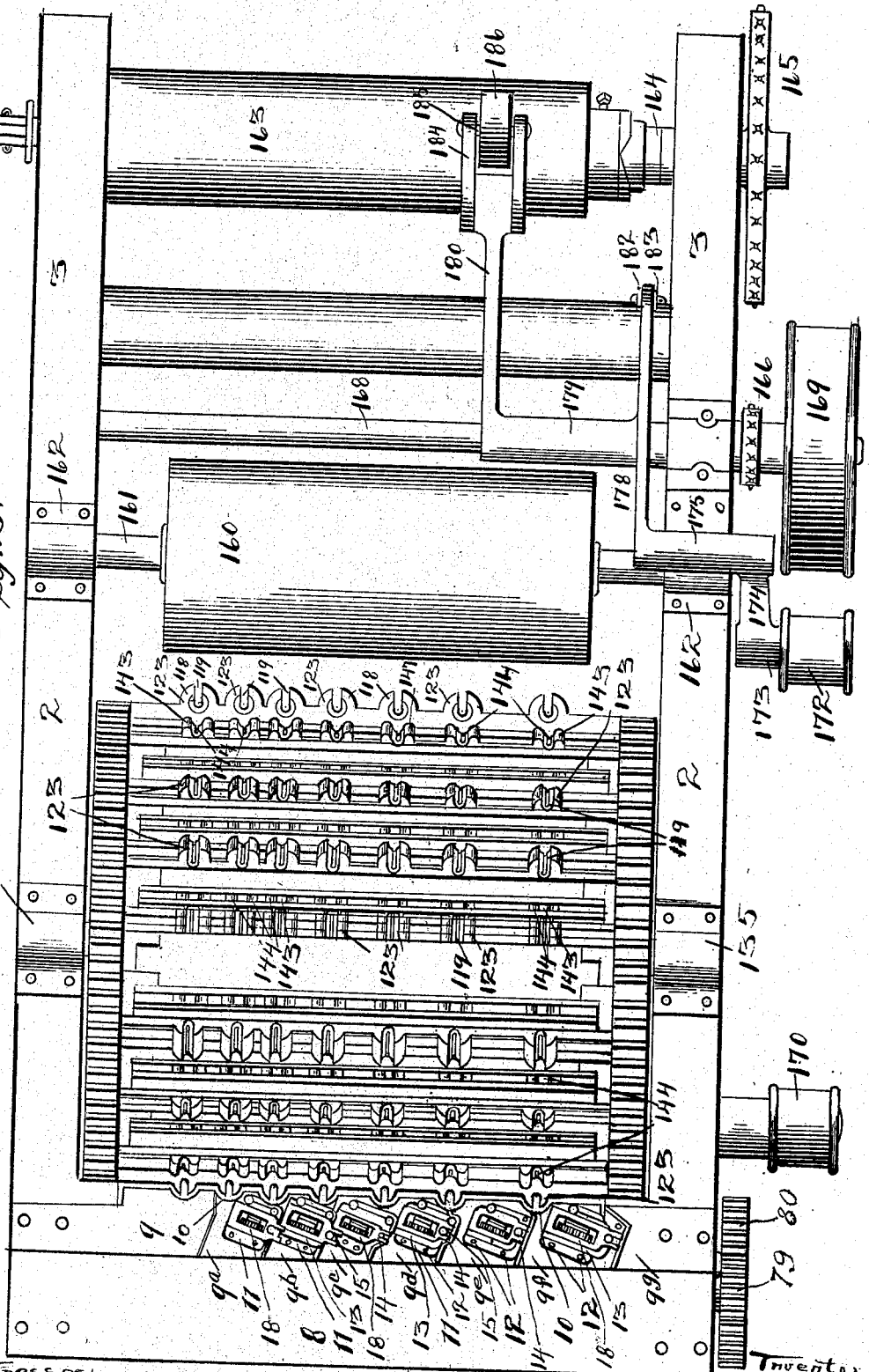

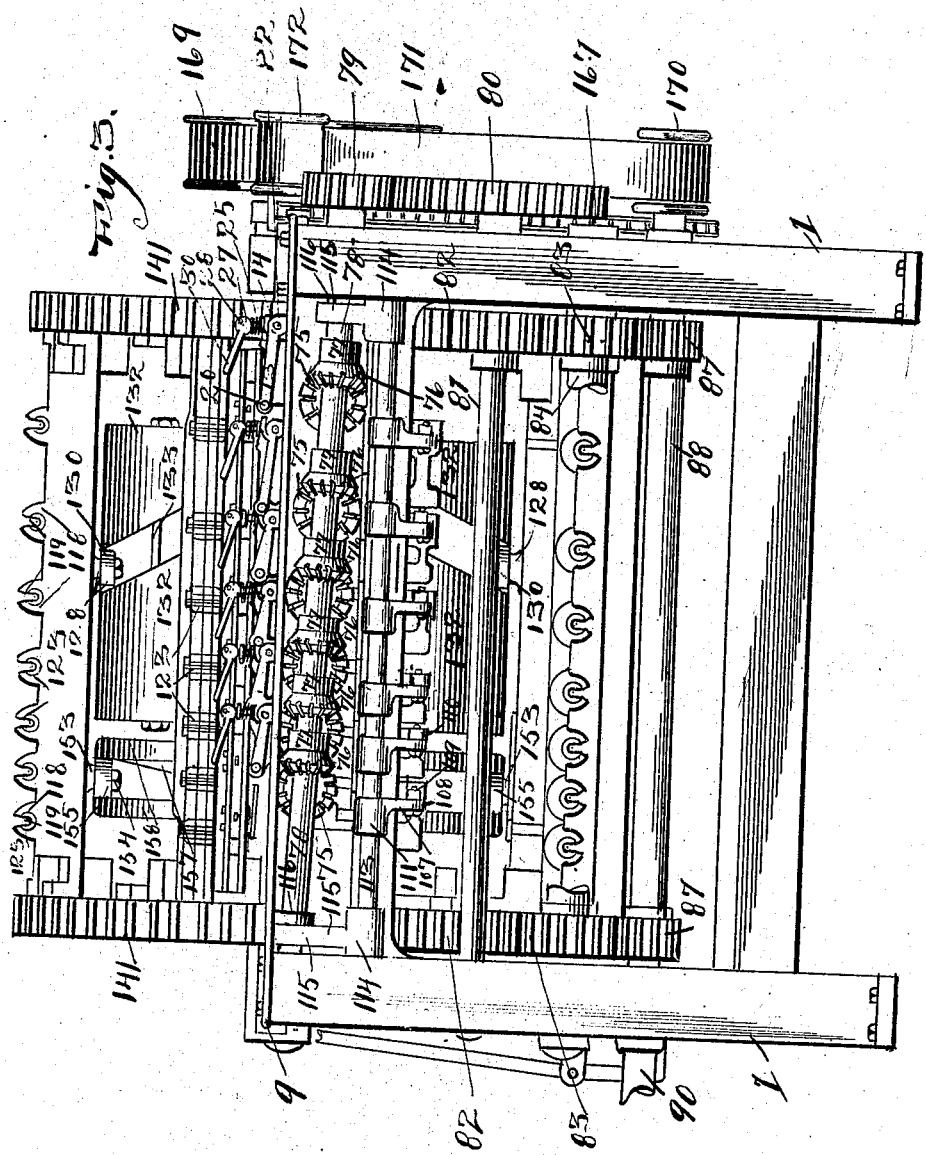

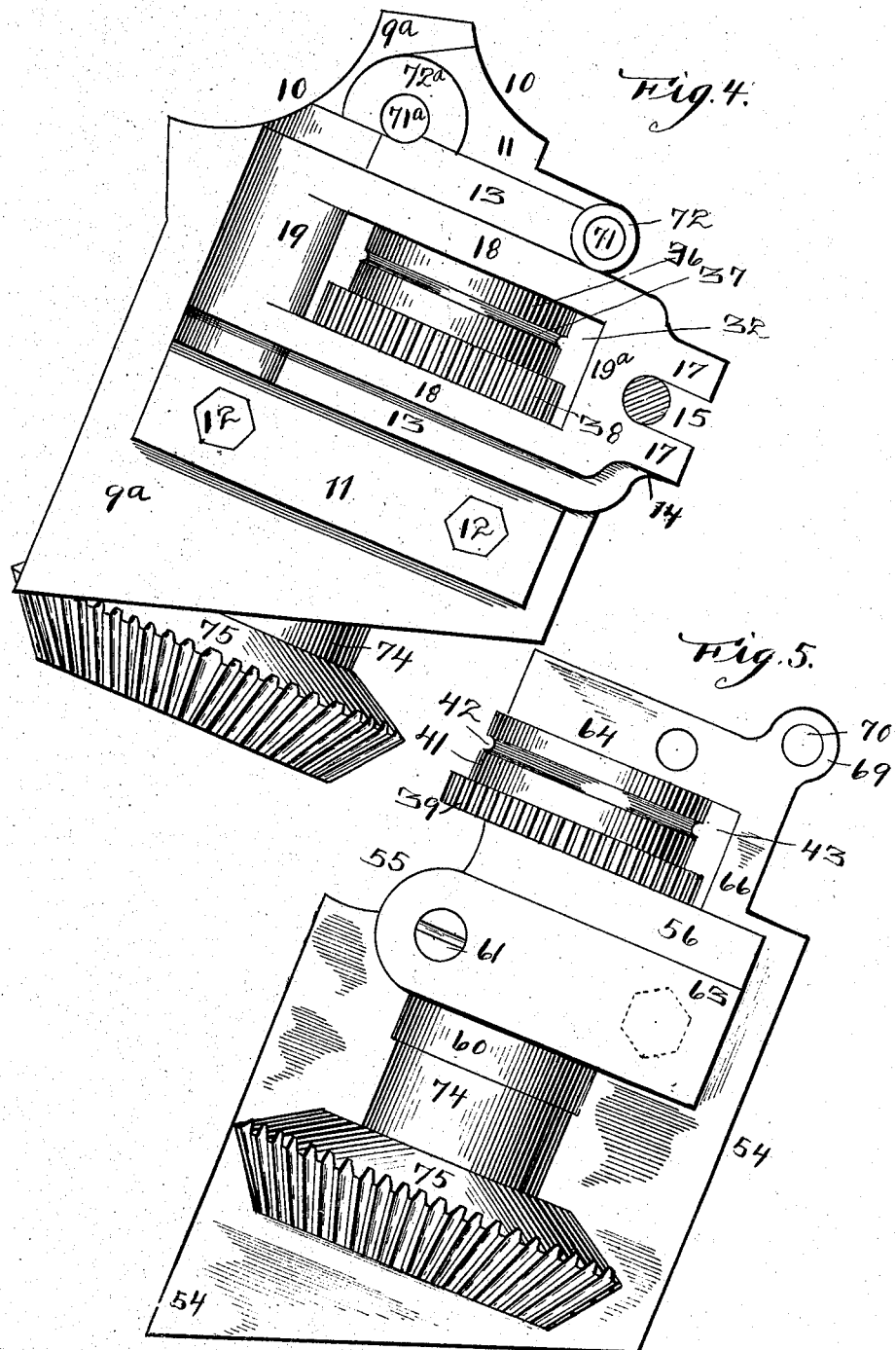

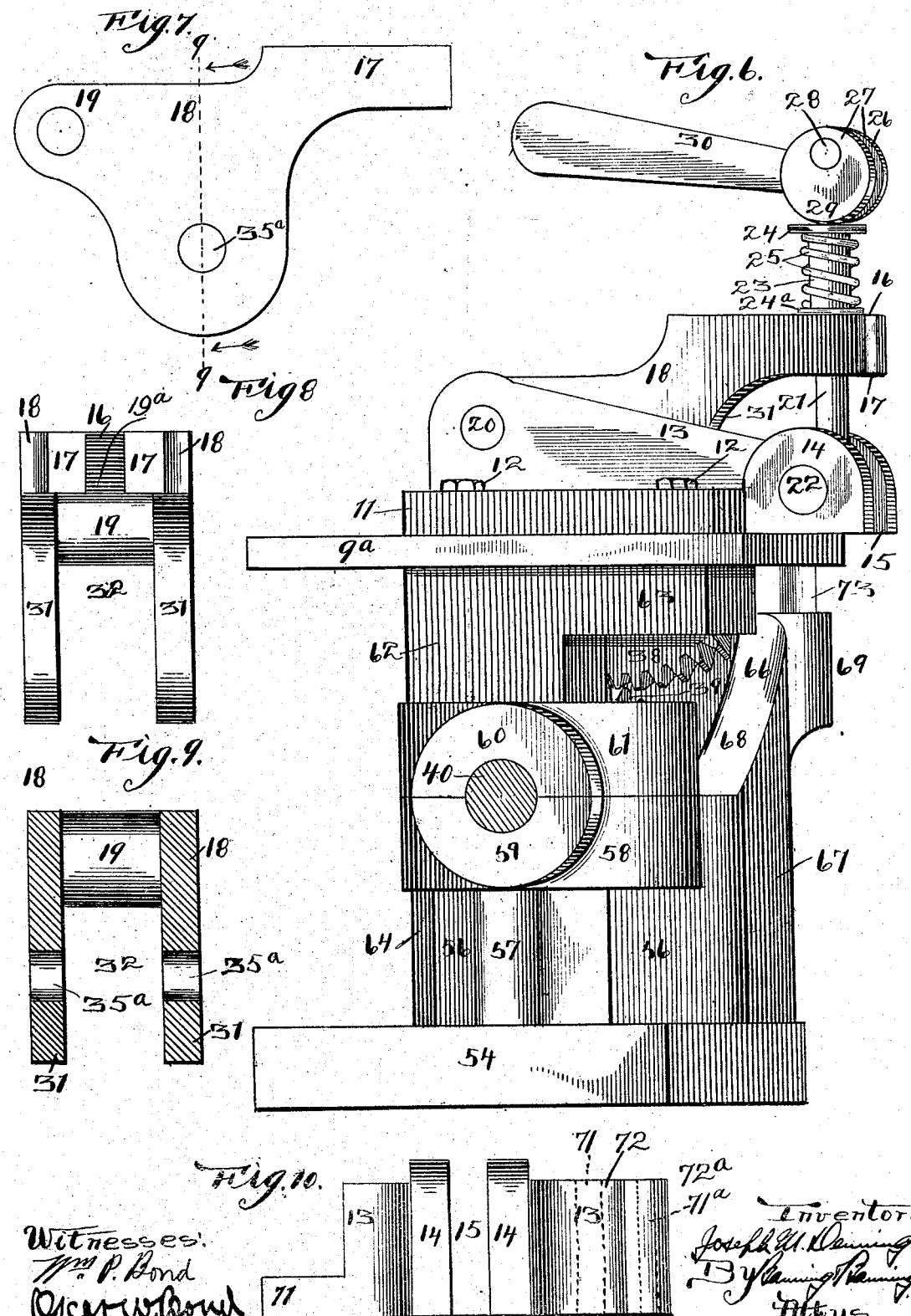

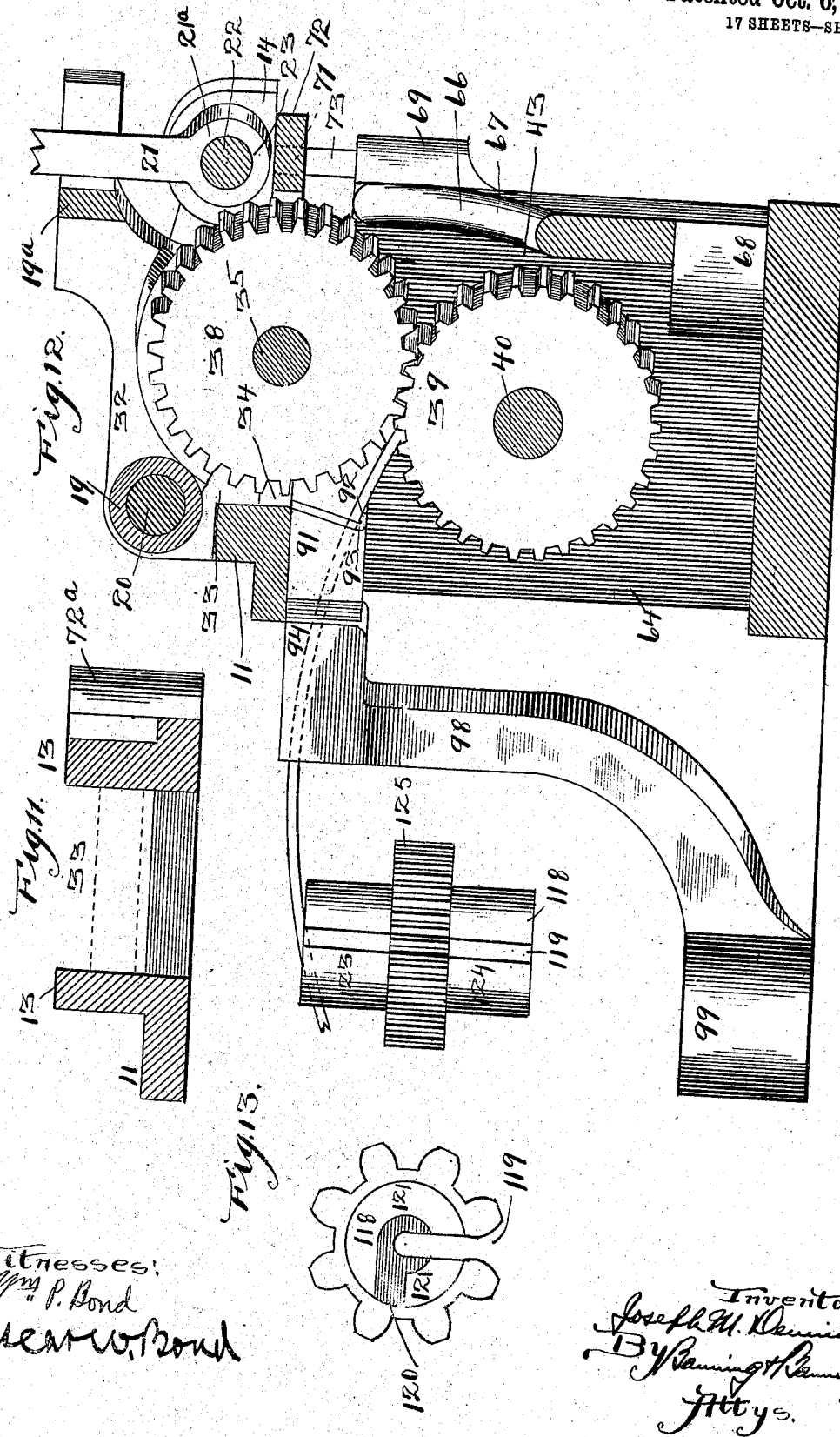

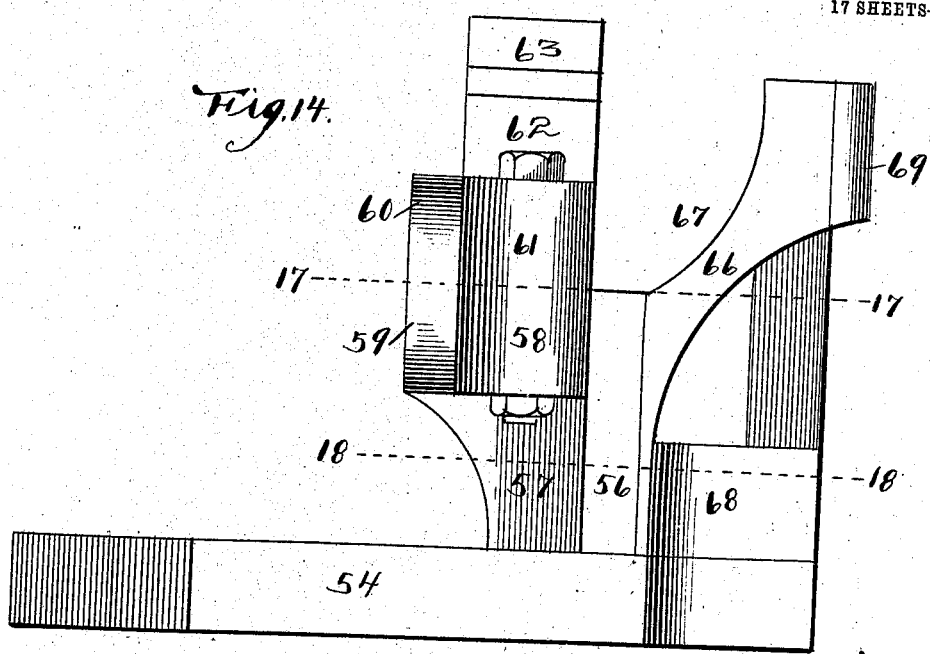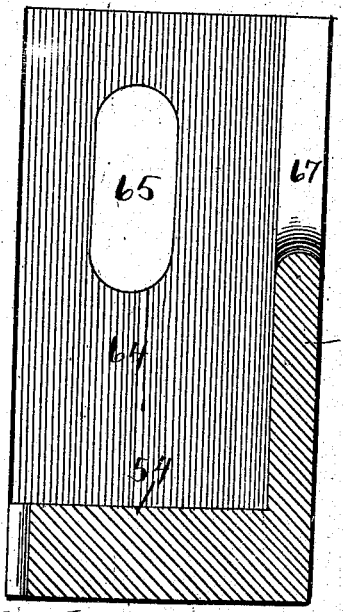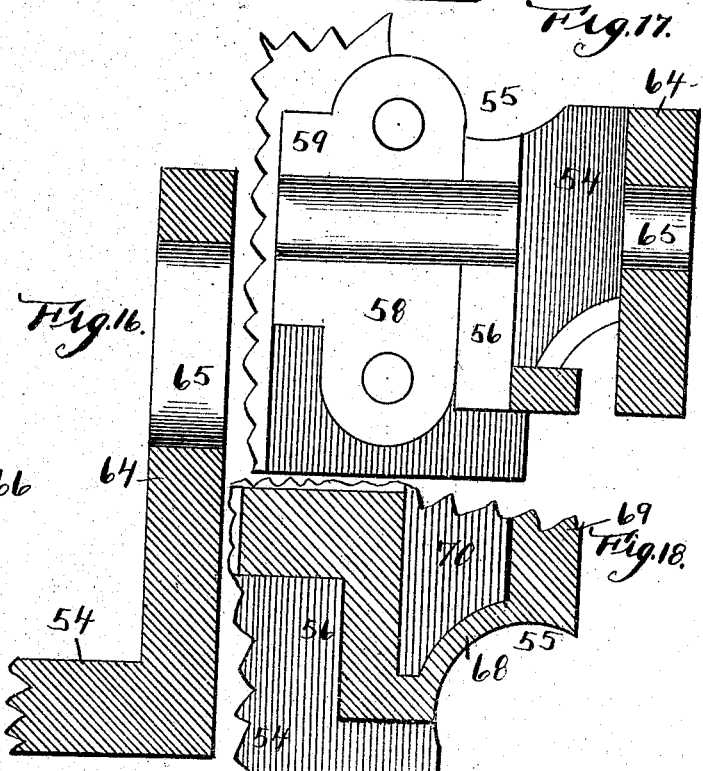

J. M. DENNING.
WIRE FENCE MAKING MACHINE.
APPLICATION FILED SEPT. 16, 1905.
900,490.
Patented Oct. 6, 1908.
17 SHEETS—SHEET 9.
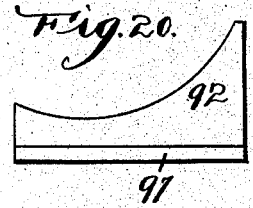
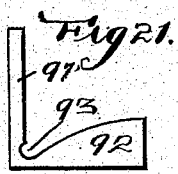
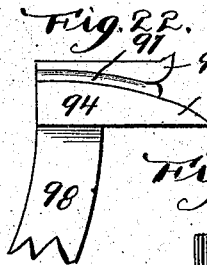
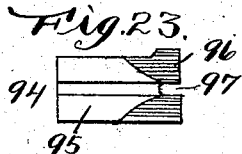
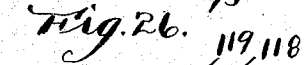
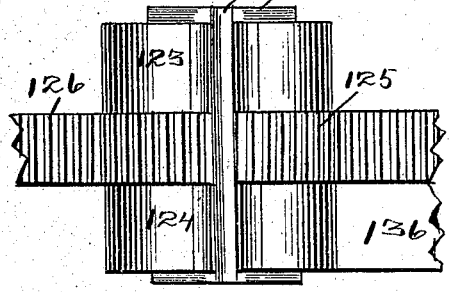
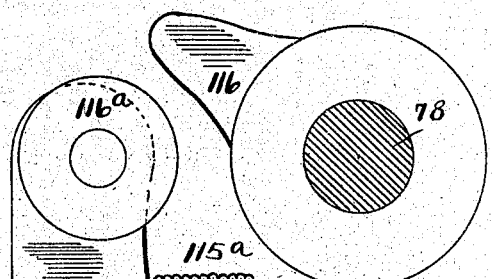
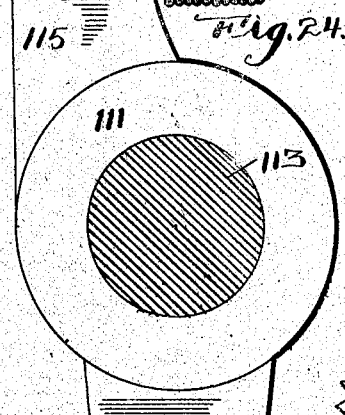
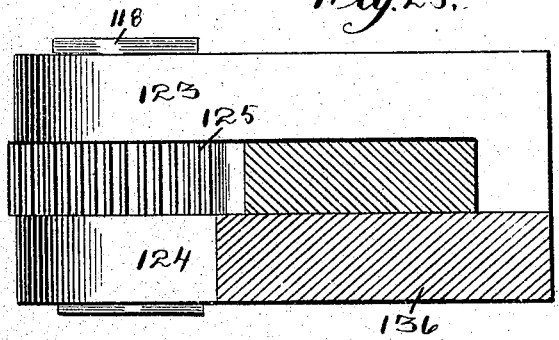
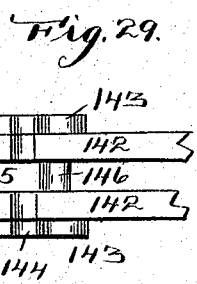
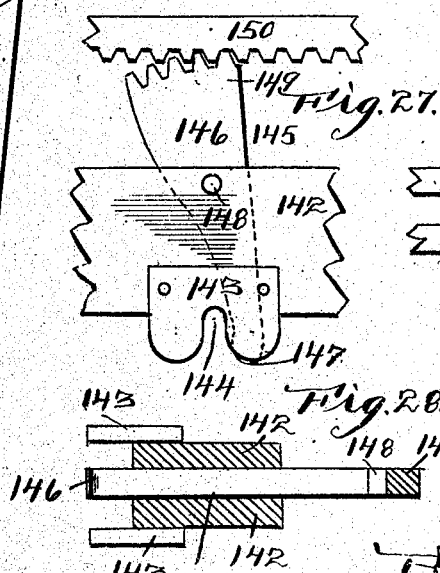
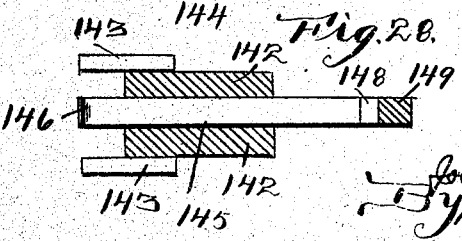

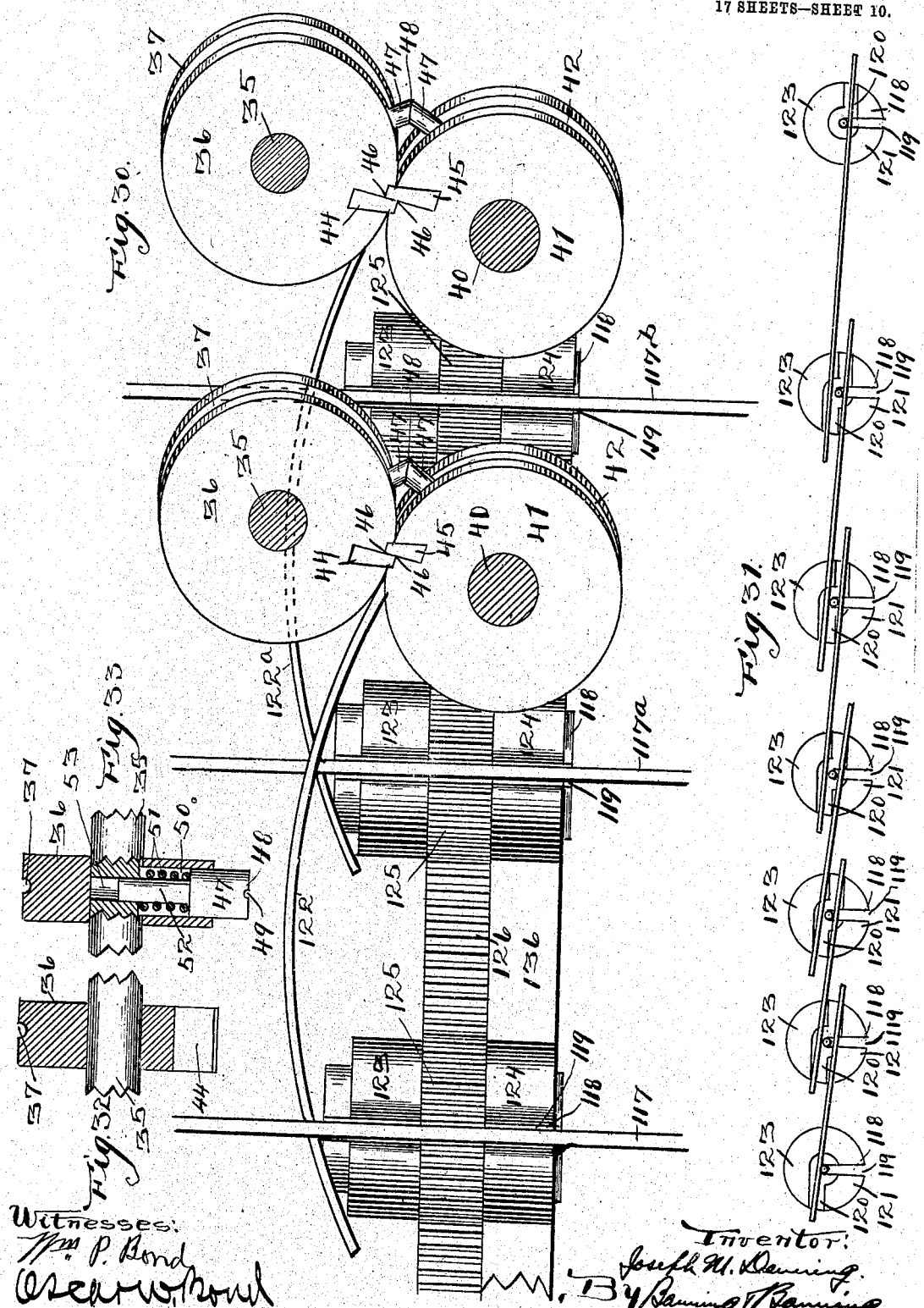

J. M. DENNING.
WIRE FENCE MAKING MACHINE.
APPLICATION FILED SEPT. 16, 1905.
900,490.
Patented Oct. 6, 1908.
17 SHEETS—SHEET 11.
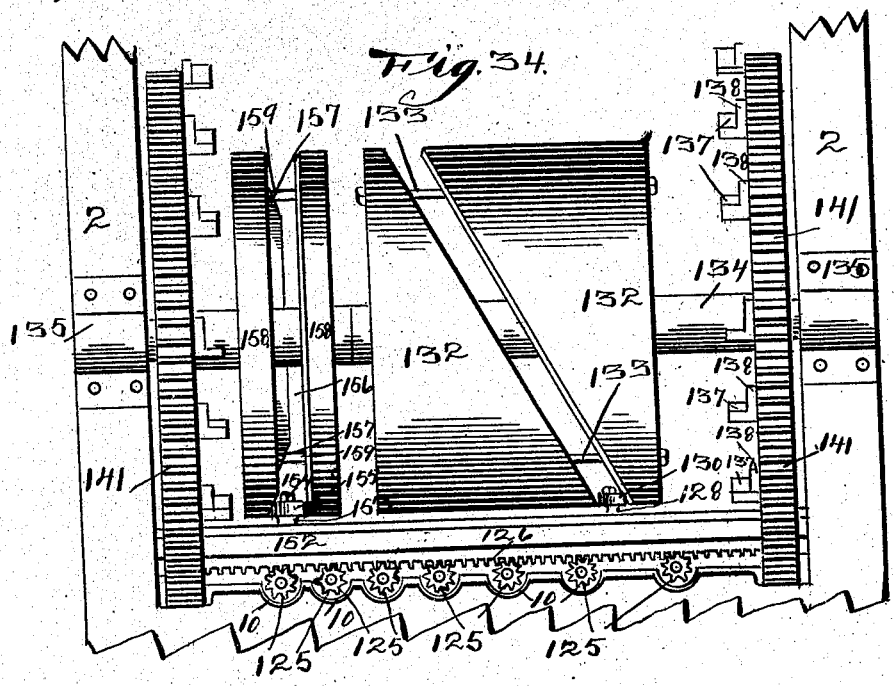
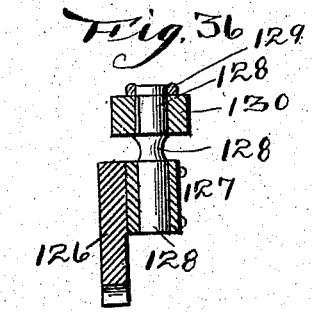
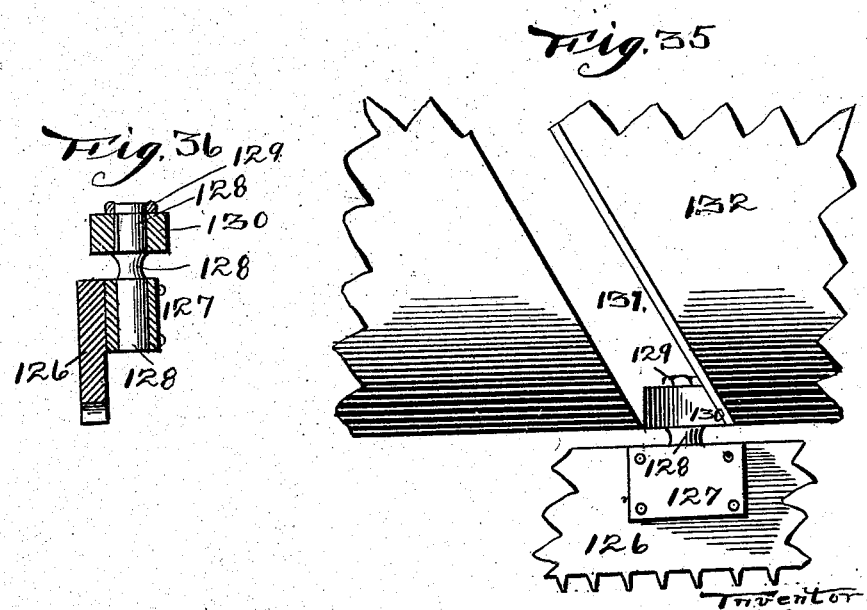

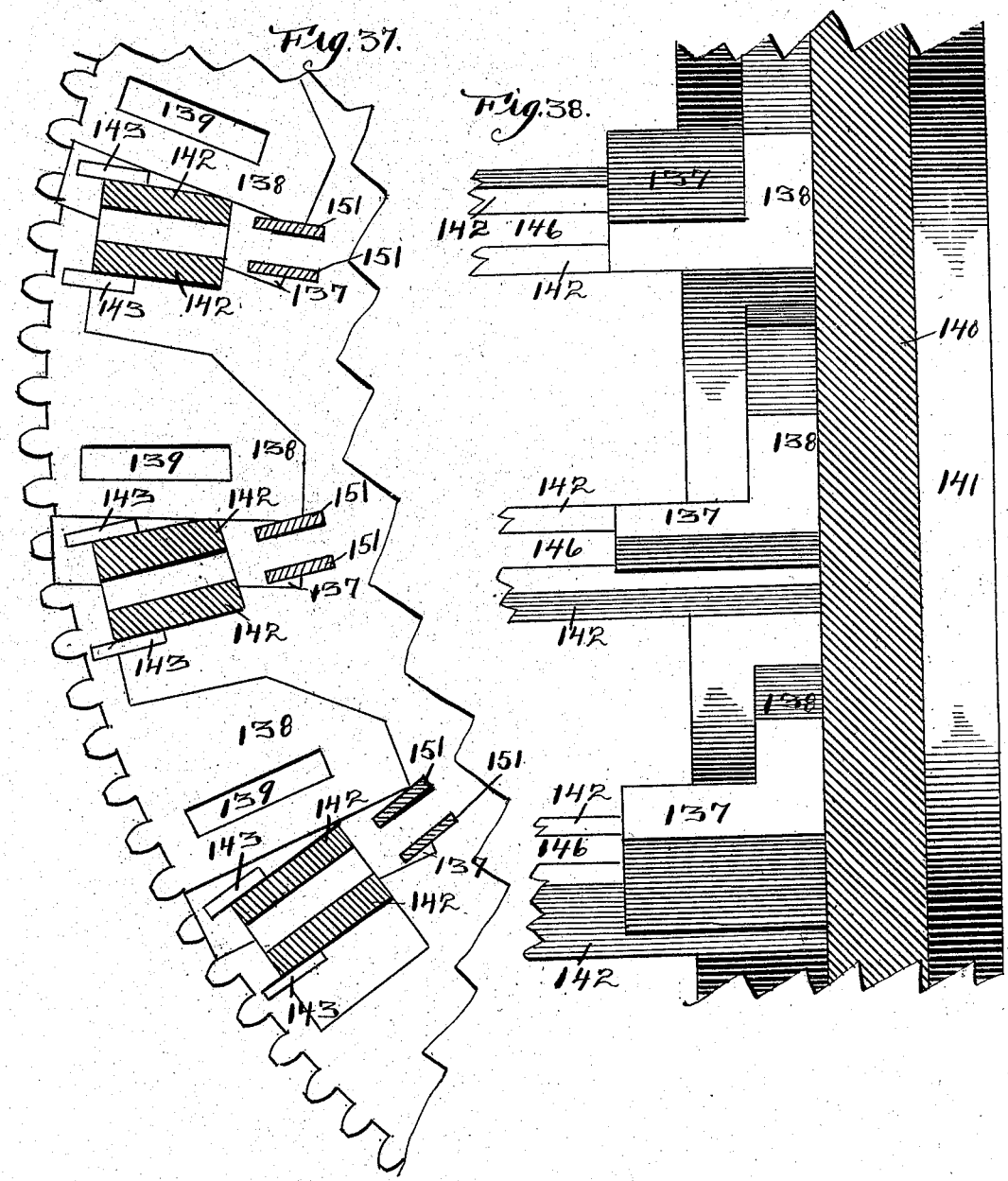

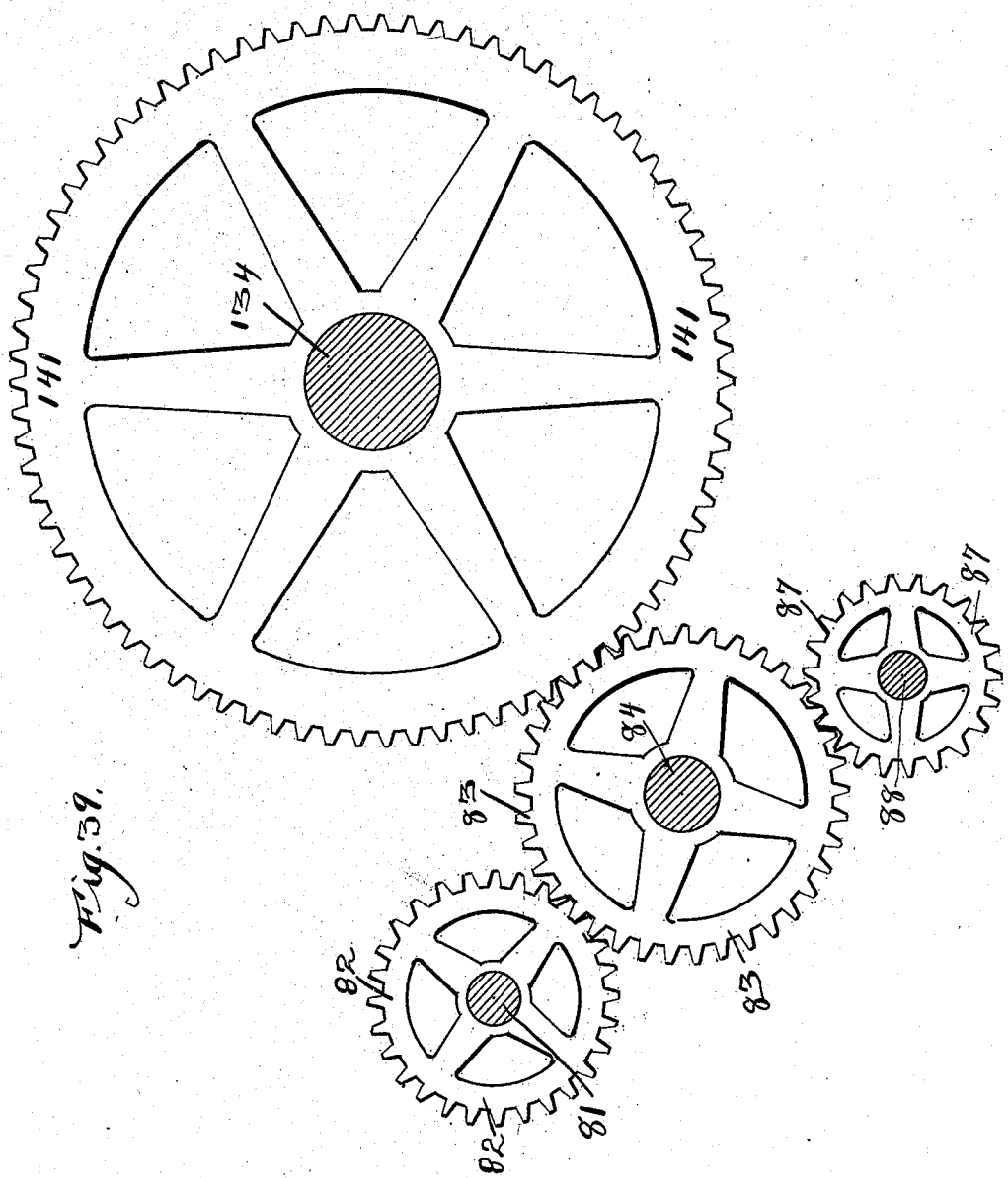

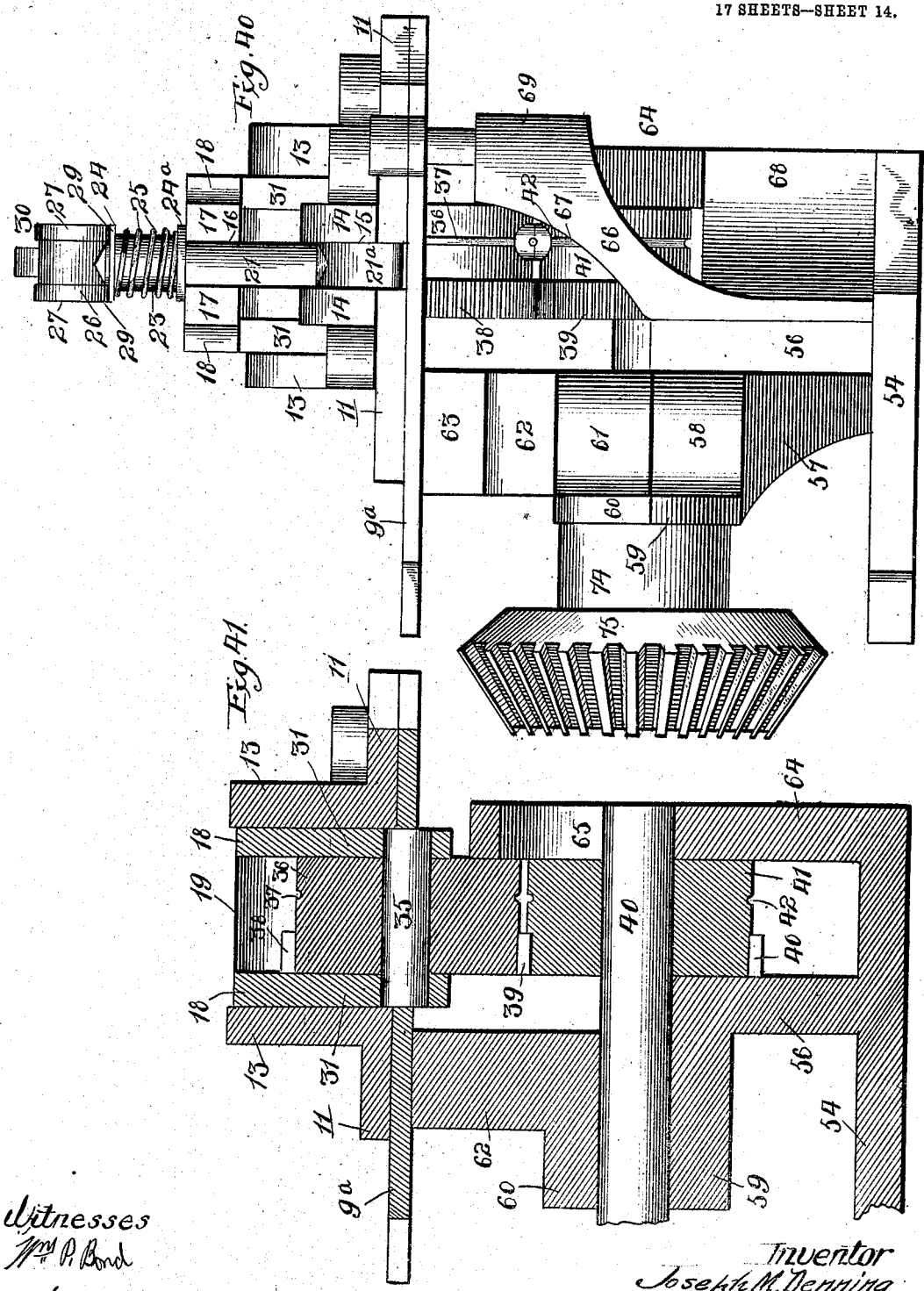

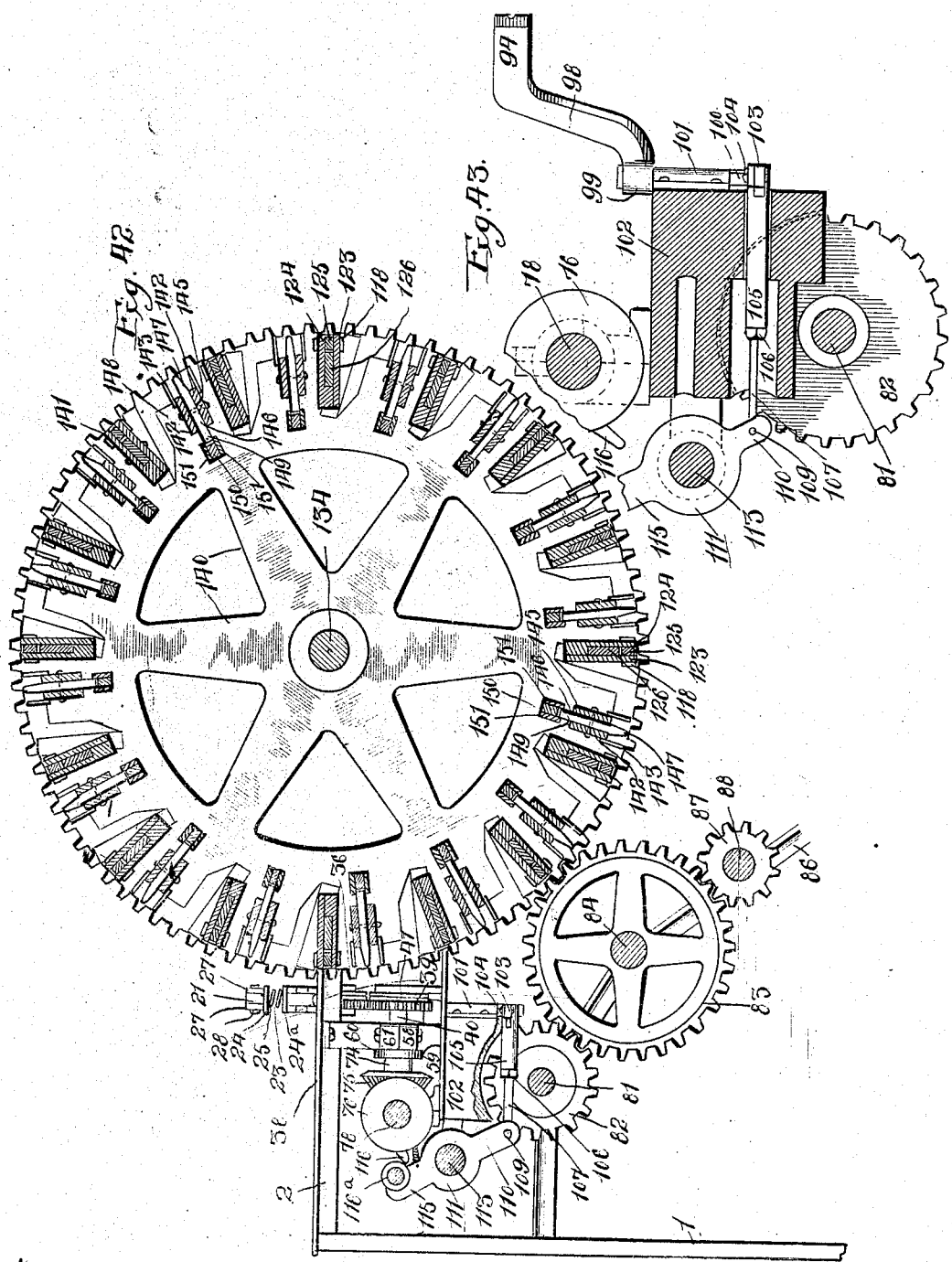

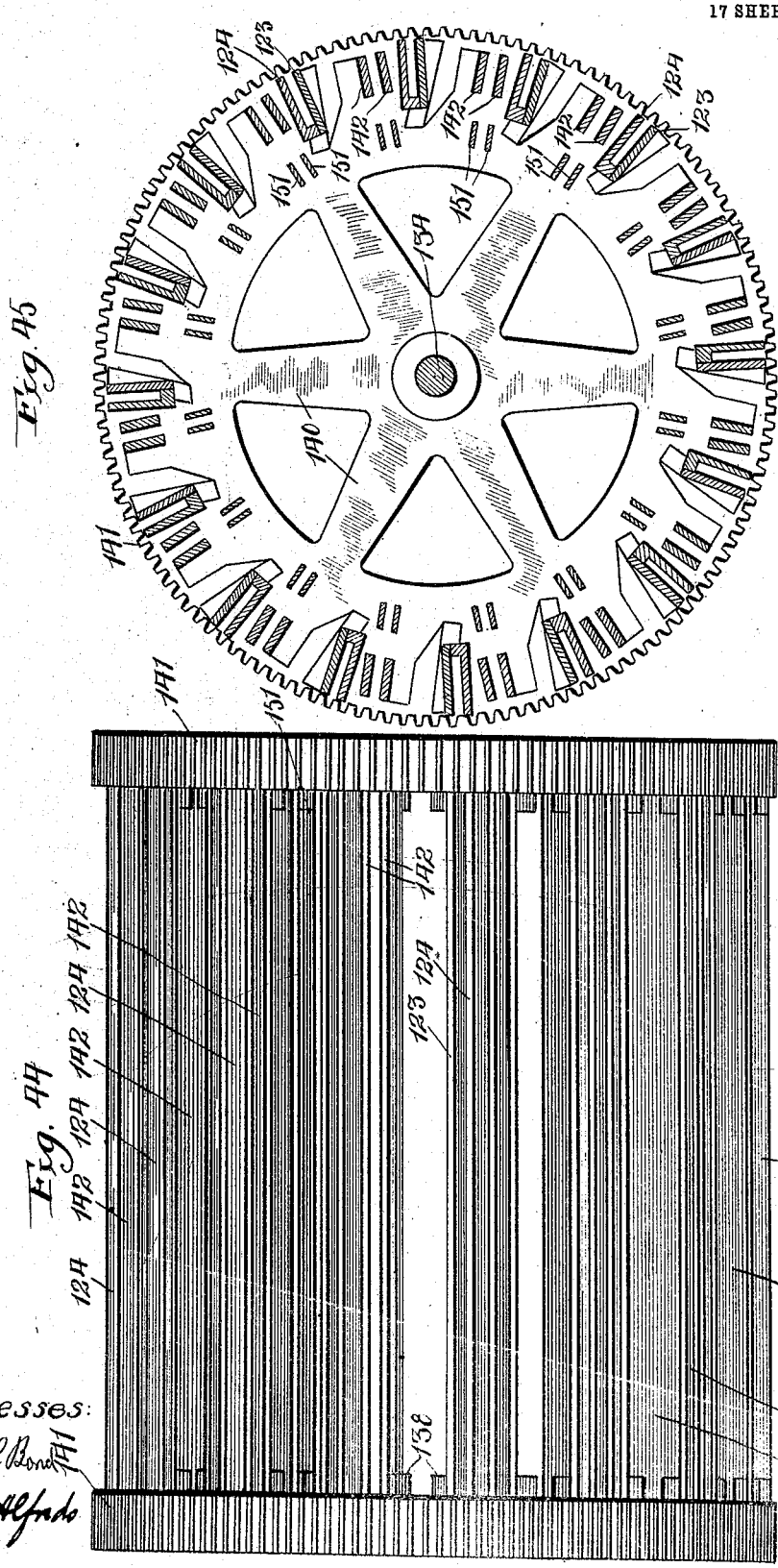

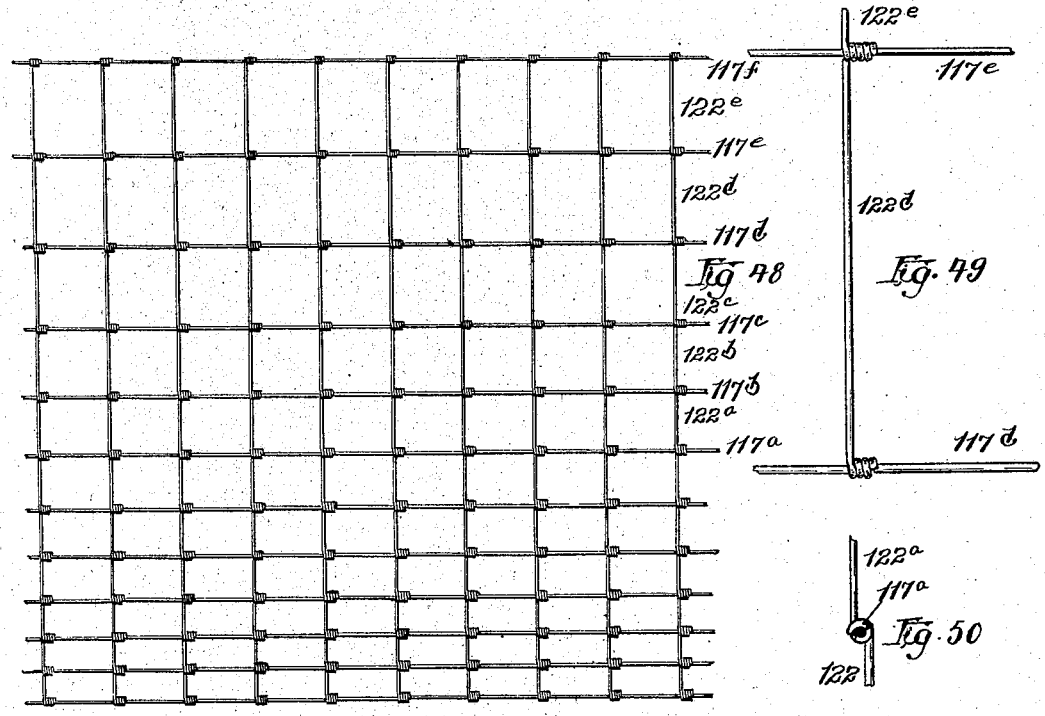
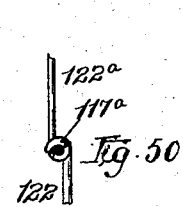
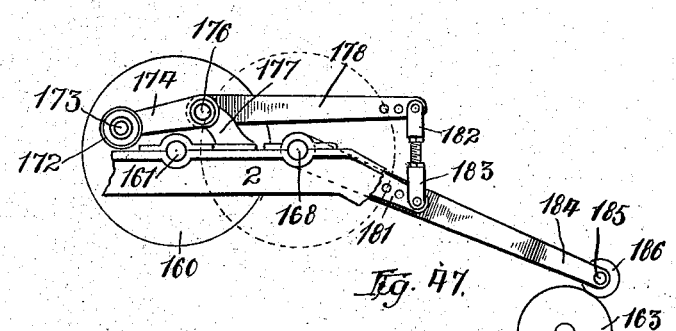
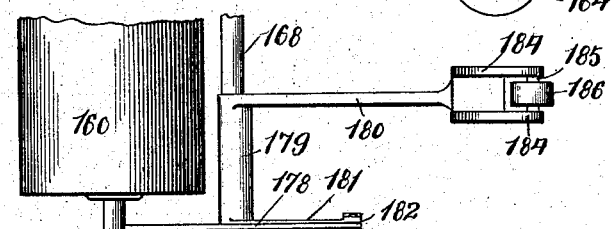
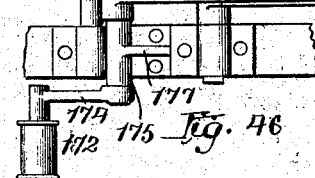

UNITED STATES PATENT OFFICE.

JOSEPH M. DENNING, OF CEDAR RAPIDS, IOWA.

WIRE-FENCE-MAKING MACHINE.

No. 900,490.      Specification of Letters Patent.      Patented Oct. 6, 1908.

Application filed September 16, 1905. Serial No. 278,758.

*To all whom it may concern:*

Be it known that I, JOSEPH M. DENNING, a citizen of the United States, residing at Cedar Rapids, in the county of Linn and State of Iowa, have invented certain new and useful Improvements in Machines for Making Wire Fence, of which the following is a specification.

The machine of the present invention is designed for making wire fence of that type in which the longitudinal or strand wires are tied together by stays, the stays consisting of sections united at their ends by coiling or winding the ends around the strand wires, thereby forming, in effect, a continuous stay extending from the upper to the lower strand wire and united to the intermediate strand wires.

The objects of the invention are to construct a machine having the capability of continuously advancing the strand wires and during the advance automatically apply the sectional stays, and this without interrupting or stopping the forward or advanced movement of the strand wires or the stay wires; to enable the mechanisms for feeding forward or advancing the strand wires and the stay wires to have both a continuous operation and at the same time allow the coiling devices for the ends of the stay sections to be operated at proper intervals for applying the stay sections to the strand wires at the required distance apart for the stays when in place; to furnish a feeding mechanism for each stay wire with a cutting mechanism therefor by which the several sections of the stay will be fed forward and severed for the prop. length of stay to span the space between the strand wires of the respective stay sections; to furnish supports for each stay section, after passing the feed mechanism and being severed, one support having a fixed relation and the other support being movable for carrying the several stay sections into position against the strand wires and in proper relation for the operation of the coiler or twister heads, by which the crossing ends of the several sections of the stay are coiled around the adjoining strand wire; to mount a plurality of coiler or twister heads on a revoluble carrier, with the coiler or twister heads arranged in sets or series and having in each set or series a number of coiler or twister heads corresponding to the number of the strand wires; to operate the several coiler or twister heads in each series by means of a reciprocating rack-bar and a pinion on each coiler or twister head, by which all of the coiler or twister heads will be simultaneously actuated; to reciprocate each rack-bar through the medium of a roller on the bar and an inclined groove in a fixed head, which groove furnishes a trackway by which, as the carrier or drum supporting the coiler or twister heads is revolved, the rack-bar of each series of coiler or twister heads, as the roller travels up and down in the inclined circular trackway, will be reciprocated; to crimp or bend the several strand wires intermediate of the stay wires, to provide for expansion and contraction of the strand wires; to furnish a crimping mechanism comprising two plates mounted on the carrier for the coiler or twister heads, and an oscillating arm for each pair of plates, the arm having an acting end to engage the coil and having also a segmental rack engaging a rack-bar by means of which the acting end of the plate or arm is advanced and receded; to actuate the rack-bars of the segmental racks for the several arms or plates, by means of a roller on the rack bar and a slot in a fixed drum, which slot has straight portions and inclined portions and forms a trackway by means of which the rack bar will be advanced and receded, in passing through the inclined portions of the trackway, and will be held in a fixed position as the roller passes through the straight portions of the trackway; to enable the strand wires to be carried and supported by the several series of coiler or twister heads, in the passage of the strand wires from the point of entering a set or series of coiler or twister heads to the point of leaving the set or series of coiler or twister heads; to furnish a reel, onto which the completed fence is rolled, and means for automatically governing the speed of the winding reel to suit the increase in the size of the roll of completed fence; and to improve generally the mechanism and devices entering into the structure of the machine as a whole.

The invention consists in the features of construction and combinations of parts hereinafter described and claimed.

In the drawings, Figure 1 is a side elevation of the machine of the invention, partly broken away at the delivery end for the completed fence; Fig. 2, a top or plan view of the machine; Fig. 3, a front elevation of the machine; Fig. 4, a plan or top view of one of the feed mechanisms for the sections of the stay wires, showing the upper feed wheel and its driving gear; Fig. 5, a top or plan view of the support for the lower feed wheel and its driving gear for the stay wires, showing the feed wheel and its gear; Fig. 6, an elevation of the mechanism for feeding the sections of the stay wires, showing the position of the mechanism when on the machine; Fig. 7, a side elevation of the arm carrying the upper feed wheel and gear for feeding the sections of the stay wires; Fig. 8, an end elevation of the arm shown in Fig. 7; Fig. 9, a section on line 9—9 of Fig. 7, looking in the direction of the arrow; Fig. 10, an end elevation of the support for the arm carrying the upper feed wheel for the stay wire sections; Fig. 11, a cross section of the support shown in Fig. 10; Fig. 12, a sectional elevation of the feed wheels for the stay wire sections, showing the gears and the support therefor; Fig. 13, a face or end view of the coiler or twister head shown in Fig. 12; Fig. 14, a side view of the support for the lower feed wheel; Fig. 15, an elevation, partly in section, showing the rear wall of the support of Fig. 14; Fig. 16 a vertical section of the rear wall of the support for the lower feed wheel; Fig. 17, a cross section on line 17—17 of Fig. 14; Fig. 18, a cross section on line 18—18 of Fig. 14; Fig. 19, a plan view, partly broken away, showing a feed mechanism, a support for the stay section after being severed and two of the coiler or twister heads; Fig. 20, a plan view of the fixed support for the stay section; Fig. 21, an end elevation of the support shown in Fig. 20; Fig. 22, a front edge view of the movable support of the stay section; Fig. 23, an end elevation of the support shown in Fig. 22; Fig. 24, a side view of the cam arm and spring for rocking the shaft carrying the several movable supports for the stay sections; Fig. 25, a side view of a coiler or twister head and its journal box with the supporting bar in section; Fig. 26 a front elevation of the parts shown in Fig. 25; Fig. 27, a plan view of one of the crimping arms for the strand wires; Fig. 28, a cross section of the parts shown in Fig. 27; Fig. 29 a front elevation of the parts shown in Fig. 27; Fig. 30, a front elevation, showing two of the feed mechanisms for the stay sections and showing also two of the coiler or twister heads; Fig. 31, an outline view, showing the coiler or twister heads and the manner of carrying the sections of the stay over the coiler or twister heads; Fig. 32, a cross section of one wheel of a pair of feed wheels for the stay wires showing one of the cutters; Fig. 33, a cross section of one of two feed wheels for the stay wires showing the clamps for holding the end of the stay wire after a section thereof has been severed or cut therefrom; Fig. 34, a plan view showing the drum, rollers and rack bar and one series of coiler or twister heads; Fig. 35, a detail, enlarged as compared with Fig. 34, showing the drum, the diagonal slot therein, the roller and a portion of the rack bar of Fig. 34; Fig. 36, a detail, partly in section, of the rack bar and roller; Fig. 37, a detail, partly in section, showing a portion of one of the heads for the carrier or the coiler or twister heads and the crimpers; Fig. 38, an elevation partly in section of the parts shown in Fig. 37; Fig. 39 an elevation showing the arrangement of the gears for driving the drum and other appliances; Fig. 40 an elevation showing one of the feed mechanisms for the stay wires; Fig. 41 a vertical section of the devices shown in Fig. 40, taken through the axles of the feed wheels; Fig. 42 a sectional elevation with the frame removed and showing the construction and arrangement of the feed devices for the stay wire and the carrier drum for the twisters and crimpers; Fig. 43 an enlarged detail showing the actuating devices for the movable section of the carrier for a stay wire section; Fig. 44 an elevation of the drum with the coilers and crimpers omitted; Fig. 45 a cross section of the drum with the coilers and twisters omitted; Fig. 46 a detail, being a plan view of the belt tightener; Fig. 47 a side elevation of the parts shown in Fig 46; Fig. 48 an elevation showing the fence made on the machine having, however, a greater number of longitudinal wires than the number of coilers in the other figures of the drawings; Fig. 49 an enlarged detail showing two longitudinal wires and a connecting stay section; and Fig. 50 a detail showing a longitudinal wire in section and a portion of two of the stay sections.

The machine, in the construction shown, has two side frames for supporting the several mechanisms; and each side frame is formed of a front corner post 1, a top rail 2 having an inclined portion 3 at the delivery end of the machine, a bottom rail 4, a rear support or post 5, and an intermediate support or post 6, with a segmental brace 7 between the top rail and the intermediate support or post as shown in Fig. 1; but the frame could be of other suitable construction adapted to furnish the necessary support for the mechanisms of the machine.

At the front end of the machine, in the arrangement shown, is a top plate 8, extending from side frame to side frame and secured to the top rails of the side arms, and forward of the plate 8, is a second plate made up of sections 9, 9$^a$, 9$^b$, 9$^c$, 9$^d$, 9$^e$, 9$^f$, 9$^g$, the several sections extending from side rail to side rail, and the end sections being secured to the upper face of the top rails 2 of the side frames, as shown in Fig. 2. The several sections 9$^a$ to 9$^f$, both inclusive, furnish a plate or base for carrying the upper feed wheel for the feed of the several stay wires. The forward edge of each plate or base is cut away on a circle so as to leave a semi-circular opening or space 10 on both sides forwardly to effect a perfect clearance for the stay sections at the point in line with the several coiler or twister heads and for the upward passage of the coiler or twister heads. The support or mounting for the several upper feed wheels for the stay wires is the same in each instance, and a description of one support or mounting will describe all of these supports or mountings. A flange or plate 11, is secured, by bolts 12, or otherwise, to the upper face of a section of the main plate, and upwardly extending from the flange 11 on each side is a flange or bar 13, each flange or bar 13 terminating at one end in ears 14, with a slot or space 15 between the ears, as shown in Fig. 6. A slot or space 16 is located in line with the slot or space 15, between forks 17 of an arm 18, the other end of which arm 18 has a bearing 19, mounted on a journal pin 20, secured in the side bars or flanges 13 of the main support.

A draw-rod or stem 21, having at its lower end an eye 21ª, is mounted by the eye on a cross pin 22, secured in the ears 14 of the main support, with the eye in the space or slot 15 between the ears; this draw-rod or pin 21 passes up through the slot or space 16, and extends through a sleeve 23 above the fork 17, and the sleeve is located between an upper washer 24 and a lower washer 24ª, with a coil spring 25 encircling the sleeve between the two washers, as shown in Fig. 6. The upper end of the draw-rod or pin 21, enters a slot or space 26 between disks 27; and is pivotally mounted on a cross pin 28, secured in the disks 27 at one side of the center, so that the bearing edge of the disks 27 on the upper washer 24 forms a cam 29, by which, through the resiliency of the spring 25 the free or slotted end of the arm 18 will be held under a yieldable pressure in carrying the upper feed wheel for the stay wire. The disks 27 are connected to or formed with a handle or lever 30, by means of which the disks 27 can be rotated to cause the cam edge 29 to act and operate against the upper washer 24 and move said washer downwardly on the sleeve 23 to compress the coil spring 25 and have the lower washer, through the spring, force down the outer free end of the arm 18, the arm swinging on its journal 20, between the side bars or flanges 13 of the main support.

Each side rail of the arm 18 has a depending ear 31; and between the side pieces of the arm 18 and the bearing 19 and cross bar 19ª is a space or opening 32, which extends down between the ears 31 and in which is located the upper feed wheel for the stay wire, together with its driving gear; and in line with the opening or space 32 and between the side bars 13 of the main support is an opening 33, which is also in alinement with an opening 34, formed in the plate or base on which the support as a whole is mounted. A journal pin 35 is secured in the ears 31 and extends across the space or opening 32, between the ears; and on this journal pin 35 is mounted a feed wheel 36, having a circumferential groove 37 for the reception of the stay wire. The feed wheel 36 is secured to a gear or pinion 38, also mounted on the journal pin 35, and free to revolve, together with the feed wheel, on the journal pin. The gear wheel 38 meshes with a companion gear wheel 39, fixedly mounted on a driving shaft 40; and connected with the gear wheel 39 is a companion feed wheel 41, having a circumferential groove 42, in alinement with the groove 36 for receiving the stay wire. The gear 39 and the feed wheel 41 are located in an opening or space 43, formed in a support for the wheels and located below the main plate or base of the support for the upper feed wheel and gear. The upper feed wheel 36 has a blade or cutter 44 inserted in its body, and the feed wheel 41 has inserted in its body a blade or cutter 45, and each blade or cutter 44 and 45 has a cutting edge 46, which projects beyond the periphery of the respective feed wheels and by which cutting edges, as the two cutters pass each other in the rotation of the feed wheels, the section of the stay will be cut or severed from the stay wire. Each feed wheel 36 and 41 has a plunger 47, terminating in an end 48, having therein a groove 49, to clasp the stay wire. Each plunger 47 is located in a hole 50, formed in the body of the feed wheel, and each plunger is yieldably held by a coil spring 51, located in the hole 50 and encircling a stem 52, inwardly extending from the body of each plunger, which stem is free to slide back and forth in a hole 53, extending into the journal pin or shaft of the feed wheel. The plungers 47 and 48 constitute a clamp by means of which the advance end of the stay wire will be caught and held, after the stay section has been severed therefrom, so that the advance end will be held in position to enter the groove between the feed wheels, after the severance of the stay section, for the feed wheels to again act and advance the stay wire into position for the severance of the next section.

It will be understood that, inasmuch as the stay sections vary in length, the diameter of the feed wheels will also vary in order to advance the proper length of stay wire into position for severance of a section therefrom at each complete revolution of the feed wheels, such severance occurring as the cutters come together and the cutting edges pass each other at the meeting point.

A series of plates 54, corresponding in number and shape to the plates 9ª to 9ᶠ, inclusive, each furnish a plate or base for the support of the lower feed wheel and its gear wheel; and each base plate 54 at each forward corner is cut away to form a passage or opening 55, coinciding with the passage or opening 10 in the upper base plate for the passage of the coiler or twister. A back wall 56 extends upwardly from each base plate 54, and for the purpose of giving additional strength a curved rib or flange 57 connects the back wall 56 with the main base plate. The back wall has at its upper end a cross wall 58, extending out from which is a rim or flange 59, forming with the back wall and the cross wall a half journal box or bearing for the shaft 40 of the lower feed wheel. A flange 60 coinciding with the flange 59 and a cross wall 61 coinciding with the cross wall 58, forms the remaining half box for the shaft 40. The cross wall 61 has extending up therefrom a wall 62, with a side extension 63, furnishing a standard for the plate or base of the support for the upper feed wheels, the plate or base for the upper support being attached to the wall 62, and the side extension 63, by screws or otherwise, so that, when the two supports are united, a continuous support will be furnished for the upper and lower feed wheels, which support stands at an angle, thereby giving a diagonal line of run for the feed wheels, by which each stay wire at its advanced end will be carried inwardly and laterally, so as to overlie a coiler or twister head at its extreme advance end. A rear wall 64, having therein a vertical slot 65, completes the lower support; and the driving shaft 40 passes through the slot 65, by which arrangement, in order to remove the lower feed wheel and its gear with the shaft 40, all that is necessary to be done is to remove the upper half of the journal box or bearing for the shaft 40, in which case the shaft with the gear wheel and feed wheel can be raised so as to have the shaft clear the lower half of the journal box or bearing, thus enabling the shaft and the feed wheel and its gear to be readily and quickly removed for repairs or for changing the feed wheels as required for the proper diameter of the wheel to feed the required length of stay section into position for severance. A cross wall or flange 66 extends from the back wall 56 to the rear wall 64 for stiffening purposes, and the upper portion of the cross wall or flange 66 is cut away to leave an opening 67 for the passage of the forward end of the stay wire to enter between the upper and lower feed wheels; and as shown, for additional strength, and to furnish a clearance for the coiler or twister, a semicircular wall 68, extends from the cross wall 66, to the rear wall. At the upper corner of the rear wall 64 on one side is a boss 69, having a central vertical hole 70, which alines with a hole 71, in an ear 72, on the upper base plate 11, so that a bolt 73 can be passed through the holes 70 and 71 and secure the upper base plate firmly in position against any excess strain from the feed wheels; and as shown, the upper base plate 11 and the rear side bar 13 have a hole 71$^a$ in an ear 72$^a$ for the passage of a bolt or screw, by means of which the other corner of the upper base plate can be secured to the rear side of the lower base plate, thereby furnishing additional protection against strain in use.

The shaft 40 has fixed thereto a hub 74 of a bevel gear 75, which meshes with a bevel gear 76, the hub 77 of which is fixed to a driving shaft 78, supported in suitable journal boxes on the top rails of the side frames, and this shaft 78, in order to accommodate the decrease in size of the feed wheels is set at an inclination, as shown in Fig. 3. The shaft 78, at one end, has fixed thereon a gear 79, which meshes with a gear 80 on a shaft 81, supported in suitable journal boxes on the side frames; and the shaft 81 has fixed thereon a pinion 82, which meshes with a gear 83 fixed on a shaft 84, supported in journal boxes 85, on an inclined rail 86 of the side frames, as shown in Fig. 1. The gear 83 meshes with a driving pinion 87, on a main power shaft 88, which shaft is supported in suitable journal boxes 89, on the inclined rails 86 of the side frames; and one end 90 of the shaft 88 extends beyond the side frame and has thereon fast and loose pulleys, not shown, by means of which the main shaft 88 is driven from any suitable source of power.

Each section of the stay, after being severed at the feed wheels therefor, extends laterally and inwardly and passes over a fixed support and a movable support. The fixed support is formed of a vertical wall 91 depending from each upper supporting or base plate 11, and a horizontal or laterally extending wall 92, having a curved upper face, with a semi-circular recess 93 at the corner or juncture of the two walls 91 and 92, into which groove or recess the advance end of the stay wire enters, and is held and guided while being advanced to its final limit. The curved surface of the horizontal or lateral wall 92 coincides, approximately, with the curvature of the stay wire after it passes the feed wheels, so that the curvature is maintained and the advance of the wire, by the action of the feed wheels, is facilitated; and the horizontal or lateral plate or wall 92 projects rearwardly a sufficient distance to furnish a support for the end of the stay wire, until the end has been carried into position initially over the coiler or twister heads. The movable support for the stay section consists of a head 94, with its end adjacent to the fixed support formed with an under lip 95, having a curved upper face and an upper lip or point 96, having a curved under face, by which the leading end of the stay wire is guided into a slot 97 in the front edge of the head, which slot holds the severed section of the wire while being carried forward into its position relative to the two coiler or twister heads, by which the ends of the stay sections are coiled around two adjacent strand wires. The head 94 is carried by an arm 98, terminating in a socket 99, fixed on a journal pin or short shaft 100, mounted in a journal box 101, on a cross beam 102, extending from side frame to side frame, and on which beam the series of lower plates 54 are secured. The other end of the journal pin or short shaft 100 has fixed thereon an arm 103, the outer end of which is attached by a pin or pivot 104, to a head or socket 105, against the end of which abuts a nut 106 on the threaded end of a rod 107, which threads into the end of the hub or socket 105, for its length to be adjusted by means of the lock nut 106 so as to give the proper throw to the arm 103 to advance and recede the head 94, as required for carrying the stay section into position over the coiler or twister heads and returning the head into normal position to receive the next succeeding stay section before its severance from the stay wire.

The rod 107 at its end has an eye 108, through which passes a pivot pin or bolt 109, projecting out from an ear or arm 110 downwardly extending from a socket 111, attached by a set screw or bolt 112 to a rock shaft 113, mounted in suitable journal boxes on the side frames. The rock shaft 113 adjacent to each end, as shown, has fixedly mounted thereon a socket 114 (Fig. 3) extending up from which is an arm 115, which engages a cam 116 fixed on the shaft 78, so that as the shaft 78 revolves the cam will act on the arm 115 and rock its shaft in a direction to throw forward the head 94 and carry the stay section into position over two coiler or twister heads; and after the stay section has been carried forward the head is returned to normal position by the action of a coil spring 115ª, attached at one end to the arm 115, and at the other end to a fixed point on the side frame of the machine. It will be understood that each cam 116 is so set as to act on its arm 115, at the time of severance of the stay section from the stay wire, and swing the carrying head 94 forward so as to bring the stay section into position; and each cam 116 passes from its arm 115, when the head 94 has reached the limit of its advance position, so that the head is returned into normal position before the leading end of the stay wire has passed over the fixed support. It will thus be seen that the operation of the movable support for the stay wire does not interfere with the continuous feed of the stay wire; and at the same time the severed section of stay is carried into position for the operation of the coiler or twister heads, thus enabling a continuous feed to be maintained for each stay wire.

It will be understood that each feed mechanism, or pair of feed wheels, has a co-acting support for the severed stay section, consisting of a movable support and a fixed support; and that the movable supports are all operated simultaneously from the rock shaft, so that all of the severed sections of the stay will be simultaneously carried forward into position for their ends to overlie the coiler or twister heads in position for the action of the coiler or twister heads to coil the ends of the stay sections together and around the strand wires, making in effect a continuous stay from the several sections.

The number of strand wires can be varied as required for the height of fence desired. The machine shown is adapted for seven strand wires; and in Fig. 30 three strand wires 117, 117ª and 117ᵇ are shown for the purpose of illustrating the relation between the feed wheels, two sections of the stay, three strand wires and three coiler or twister heads. Each coiler or twister head 118 has a longitudinal slot 119, extending from its periphery inward to the center; and each coiler or twister head 118 in its acting end face has a depression or recess 120, forming abutments 121, to engage the ends of the stay sections; and for the intermediate coiler or twisted heads the countersink or recess 120 extends across the full diameter of the head, so as to form two abutments or stops 121, while for the coiler or twister head, at each end of the series, the countersink or depression 120 extends laterally on one side only, forming an abutment or stop on that side, as only a single abutment or stop is required for the end coiler or twister heads, only one end of a stay section being coiled around the two outer strand wires, while two abutments or stops are required for each intermediate coiler or twister head which coil or wind the ends of two stay sections around each intermediate strand.

The stay wires lead from below upward and as many stay wires are required as is necessary to furnish sections to span the spaces between the strand wires, and with seven strand wires six stay sections are required, and therefore six main stay wires are used, two of which, 122 and 122ª are shown in Fig. 30. The severed section of the stay wire 122 extends across the space between the two strand wires 117 and 117ª, and over the acting ends of the coiler or twister heads for said strand wires; and the severed section of the stay wire 122ª extends across the space between the strand wires 117ª and 117ᵇ and its ends overlie the acting ends of the coiler or twister heads for the strand wires 117ª and 117ᵇ, and this is true as regards the remaining strand wires and the remaining stay sections, each intermediate stay section overlying at its ends the two adjacent strand wires, with the last stay section overlying the coiler or twister heads, the same as shown for the stay section of the stay wire 122 in Fig. 30.

Each coiler or twister head 118 is supported in journal boxes 123 and 124; and each coiler or twister head has a circumferential gear 125, located in the space between the two journal boxes or bearings, which gear meshes with a reciprocating rack 126, so that the movement of the rack, in one direction, will simultaneoulsy revolve all of the coiler or twister heads in the direction to wind or coil the ends of the stay sections around the several strand wires; and the movement of the rack, in the opposite direction, will return all the coiler or twister heads simultaneously to normal position. The length of end movement of the rack in both directions should be sufficient to at least coil or wind the ends of the stay sections twice around the strand wires; and the return movement of the rack reverses the rotation of the coiler or twister heads and returns them into position to receive into the slots 119 the respective strand wires.

A rack bar 126 is provided for each series of coiler or twister heads; and each rack bar has thereon a block or bearing 127, extending out from which is a spindle or journal pin 128 having an end nut 129 for retaining a roller 130 in position on the spindle or journal pin; and this roller 130 travels in a diagonal trackway formed by a slot 131 in a head 132, which head, as shown, consists of two divisions, separated a distance apart to form the slot continuously around the head on a return incline, as shown in Figs. 3 and 34; and as shown, the two divisions of the drum 132 are tied together by stay rods 133, arranged so as to leave a clear passageway for the roller in the inclined trackway. The drum is fixedly secured to a stationary shaft 134, supported in boxes or bearings 135 on the top rails of the side frames, so that the inclined trackway maintains the same relative position at all times for the travel of the rollers of the several rack bars therein. The lower bearing or journal boxes 124 for each coiler or twister head projects out from a bar 136, which bar also furnishes a guide and support for the rack bar 126; and the other journal box or bearing 123 for each coiler or twister head is connected with the fixed bar 136, so as to leave a space between the two journal boxes or bearings 123 and 124 for the passage of the rack bar, and the locating of the gears of the several coiler or twister heads. A supporting bar 136 is provided for each rack bar 126, and each supporting bar is attached to ears 137, extending out from a plate 138, in which is a slot 139 for the passage of the end of the rack bar. The plates 138 are attached to or formed with a web 140, through which also extends the slot 139 for each rack bar; and the web 140 carries a rim 141 having peripheral cogs or leaves which engage with the gear wheel 83, so that the rim 141 is revolved, carrying with it the web and the supporting bars 136, giving a continuous rotation to the supporting bars and to the rack bars and coiler or twister heads, by which the several series of coiler or twister heads will be successively brought into position to receive the sections of a stay and twist or coil the ends of the sections around the strand wires, during the rotation of the carrier or drum formed by the webs 140, the rims 141, and the connecting bars 136 which support the rack bars and the coiler or twister heads. The webs 140 and rims 141 form in fact two revolving heads; and these heads, in connection with the supporting bars for the rack bars and the coiler or twister heads, form a revolving carrier or skeleton drum, by which the strand wires with the sectional stays fixed thereto, are supported and carried forward, both during the time of coiling the stay sections, at their ends, around the strand wires and after the completion of the coiling or winding operation.

The heads for the carrier or drum of the coiler or twister heads, also carry a plurality of bars 142, arranged in pairs and extending from head to head and united to the heads at their ends in any suitable manner. Each bar of the pair of bars 142 has thereon a series of plates 143, corresponding in number to the number of strand wires; and each plate 143 has in its outer end a recess or slot 144, the two plates forming a fixed jaw of a crimper into which the strand wire enters; and between the bars 142 is a space 145 in which a plate or arm 146 constituting the movable jaw of a crimper is located so as to be in coöperative relation with the plates or jaws 143 of the crimper. The crimpers are arranged in series and correspond in number to the number of strand wires, and each series of crimpers is located between two series of coiler or twister heads. Each movable or jaw arm 146 of each crimper has an acting end in the shape of a curved point 147, to engage the strand wire midway between the stays, and by pressing against the wire to crimp or bend the same in the space between and at the points of contact for the slotted ends of the plates or jaws 143, so that the strand wire will be crimped between each pair of stays at the same time as the coiling of the stay sections on the strand wires is being done. Each arm or jaw 146 is mounted on a pivot 148 passing through the arm or jaw and the supporting plates 142; and at the base end of each arm or jaw 146 is a segmental rack 149, engaged by a reciprocating rack-bar 150, having on each side a guide-bar 151, by which the rack bar is supported and held in its reciprocating movements.

The rack bar 150 has thereon a head or bearing block 152, extending out from which is a spindle or bearing pin 153, having on its end a nut 154, for holding a roller 155 on the spindle or journal pin. The roller 155 travels in a trackway having straight portions and inclined portions; and this trackway is formed by a slot having two straight sections 156 opposite each other, and two inclined sections 157 opposite each other, which slot is formed between two divisions of a head 158, united together as shown by stay bolts 159, so as to leave the slot clear for the passage of the roller. Each roller 155, while traveling in the straight portion of the trackway or slot 156, holds each rack bar 150 immovable; and each roller 155, on entering and passing through the inclined trackway or slot 157 on one side, moves the rack bar 150 in a direction to cause the segmental rack 149 to swing each arm or jaw 146 on its pivot 148 and move the pressing point 147 in a direction to crimp the strand wires in the space 145 between the plates or jaws 143; and with the entering of the roller 155 into the inclined opposite slot or trackway 157, the rack bar 150 is returned to normal position, moving the arm or jaw 146 in the opposite direction and withdrawing the pressing point 147 from engagement, so that the strand wires each having a crimp therein with the stay fixed thereon, are free to pass from the carrier or drum of the coiler or twister heads to the reel or other place of delivery. It will be understood that a series of crimpers is provided for each series of coiler or twister heads, for performing the operation of coiling or twisting the ends of the stay sections around the strand wires and at the same time crimping the strand wires between the stays, the coiling and crimping being completed before the acting series of coiler or twister heads and the acting series of crimpers have reached the point of discharge or withdrawal of the strand wires from the heads and crimpers as the carrier or drum revolves.

The completed fence, after passing over the carrier or drum for the coiler or twister heads, passes under a roller 160, mounted on a shaft 161 supported in journal boxes or bearings 162 on the side frames of the machine. This roller 160 serves to maintain the strand wires in position to insure their withdrawal from the coiler or twister heads on the delivery side of the carrier or drum, and also aids to hold the strand wires taut, in passing from the receiving side to the delivery side of the carrier or drum for the coiler or twister heads, so that no slipping can occur to interfere with the operation of placing the sections of the stay in position and coiling the overlapping ends of the stay sections around the strand wires and around each other to complete a continuous stay. The completed fence passes from under the roller 160 onto a spool 163 of a reel, which spool is mounted on a shaft 164, supported in suitable journal boxes on the rear posts of the side frames; and this shaft 164 at one end has a sprocket wheel 165, over which and a sprocket wheel 166 runs a sprocket chain 167, for driving the reel and winding the completed fence thereon as required. The sprocket wheel 166 is fixed on a shaft 168 mounted in suitable journal boxes on the side frames of the machine and having fixed on one end thereof a driving pulley 169, over which and a driving pulley 170 on the main driving shaft 88, runs a driving belt 171 for imparting rotation to the shaft 168, and through the sprocket wheels 165 and 166 and the sprocket chain 167 revolving the reel. It will thus be seen that all the moving parts of the machine are actuated from the same main driving shaft, thereby insuring the continuous rotation of the driven shafts and consequently a continuous feed for the strand wires and for the stay wires, and this without interfering with the operation of the mechanisms for winding the ends of the stay sections around the strand wires and for crimping the strand wires between each of the stays.

The driving belt 171 must have an increase in tautness as the roll of completed fence on the reel increases in size; and for this purpose a belt tightener 172 runs on the belt 171, and is mounted on a journal pin 173 extending out from an arm 174, attached to a journal pin 176 mounted in a socket 175 on a bracket arm 177, attached to the top rail of one side frame, and from the journal pin 176 an arm 178 extends rearward. A sleeve 179 is loosely mounted on the shaft 168; and from the inner end of the sleeve 179 projects a rearwardly extending arm 180 and an arm 181 extends rearwardly from the outer end of the sleeve 179 which arm 181 is connected with the arm 178 by a link made in two parts 182, 183 for adjusting the arms. The arm 180 at its free end has ears 184 between which, on a journal pin 185, is mounted a roller 186 which runs in contact with the surface of the roll of completed fence, as it winds on the reel. The increase of the size of the roll raises the roller 186 and with it the arm 183, and with the raising of the arm 183 the arm 178 is raised correspondingly, rocking the socket 175 on its journal or bearing pin and depressing the arm 174, forcing the roller 172 with increased pressure onto the driving belt; and such increase of pressure from the roller 172 is a gradual one, corresponding to the increase of the roll of fence, so that, as the roll of fence increases in size on the reel, a corresponding increase of power for the driving belt is obtained automatically to insure the proper revolution of the reel for winding the fence thereonto.

The operation is as follows: The strand wires pass from below upward, one strand wire for each coiler or twister head; and the leading ends of the strand wires are carried through the slots of the coiler or twister heads over the carrier or drum and under the roller 160 and fixed to the spool of the reel, thereby threading up the machine as to the strand wires. The stay wires are led from below upward and the leading end of each stay wire passes between the feed wheels therefor, so as to be gripped by the feed wheels, thus completing the threading up of the machine ready for making the fence. Power is applied to the main driving shaft 88, and through the pinions 87 on this shaft and driving gears 83, which mesh with the gear rims 141 of the carrier or drum on which the coiler or twister heads and the crimpers are mounted, revolves the carrier or drum; and at the same time this shaft 88 through the belt 171, drives the pulley wheel 169 from the pulley 170, and through the sprocket wheels 165 and 166 and sprocket chain 167, drives the shaft 164 and revolves the reel to wind the strand wires thereon simultaneously with the revolution of the carrier or drum carrying the coiler or twister heads. The gear wheels 83 through the pinions 82 simultaneously revolve the shaft 81, and through the gear 80 and pinion 79 drive the shaft 78, for the series of bevel gears 76 to revolve the series of bevel gears 75 and cause each bevel gear 75 to drive its shaft 40 of each gear 39, by which the several gears 39 will revolve the companion gears 38, and through the gears 38 and 39 simultaneously revolve the feed wheels 36 and 41, for each set of gear wheels to simultaneously and continuously advance the stay wire passing between each pair of feed wheels and this advance of the stay wires will be simultaneously with the advance of the strand wires.

The full revolution of each set of feed wheels will advance the leading end of the respective stay wires the distance required for the stay sections when the cutters of the respective set of feed wheels reach the cutting position for severing the stay section from the stay wire, at which time a set or series of coiler or twister heads on the carrier or drum therefor is approaching a horizontal position for their acting ends to receive the ends of the stay sections and coil or twist the ends around the respective strand wires. The cams 116 on the shaft 113 are so fixed as to engage the rollers 116ᵃ of the arms 115 as the stay sections are severed, for the arms 115 to rock the shaft 113, and through the arms 110 advance the links or connecting rods 107 to cause the arms 103 to rock the journal or bearing pins 100 and throw the arms 98 forward, carrying with them the heads 94 of the movable support for the stay sections, thereby carrying each stay section from the fixed support and bodily moving each stay section forward for their ends to overlie the acting ends of the coiler or twister heads, as shown in Figs. 30 and 31, at which time the coiler or twister heads have reached the full horizontal position for their acting ends; and with the delivery of the stay sections to the coiler or twister heads, the cams 116 pass the rollers 116ᵃ of the arms 115, allowing the springs 115ᵃ to act and return the arms 115 to normal position, reversing the rock of the shaft 113, and through the arms 110, links 107, journal or bearing pins 100 and arms 98, returning to normal position the heads 94 of the several movable supports so that the sections of the next succeeding stay will enter the slots 95 in the respective heads 94, for the sections of the next succeeding stay to rest on the support therefor until severed and carried forward, as just described, into position for the coiler or twister heads to act and coil or twist the ends of such stay sections around the strand wires.

The set or series of coiler or twister heads, over the acting ends of which the sections of a stay have been passed as just described, with the continued revolution of the carrier or drum of the coiler or twister heads, are moved upwardly; and with the commencement of the upward or forward movement of this set of coiler or twister heads, the rack bar 126 therefor, through the pinions 125, simultaneously revolves all of the coiler or twister heads, the rack bar being moved endwise by the passage of the roller 130 in the inclined trackway or slot 131 as the carrier or drum of the coiler or twister heads revolves; and such throw endwise of the rack bar 126 continues until the roller 130 reaches the apex of the inclined trackway or slot on one side, at which time the rack bar 126 has moved a sufficient distance to revolve the pinions 125 at least two revolutions, causing the set or series of coiler or twister heads to coil or mind the ends of the stay section twice around the respective strand wires, uniting the stay sections to the strand wires and forming, in effect, a continuous stay united to each strand wire. The forward rotation of the carrier or drum of the coiler or twister heads is coincident with the advance of the strand wires and the stays united thereto, and in such advance that portion of the strand wires between two adjoining stays lies between the fixed gripping plates or jaws 143 of the advance series of crimpers, with the strand wires entered into the slots 144 of the plates or jaws; and, with the strand wire in this position, the acting end 147 of each movable arm or jaw 146 is forced forward by its segmental rack 149 and the rack-bar 150, through the endwise movement of the rack-bar from the passage of the roller 155 in the compound trackway or slot 156 and 157, as the roller engages and passes through the inclined portion 157 of the trackway or slot; and the advance of the acting end of the crimper arm, by its engagement therewith forces the strand wire laterally and bends or crimps the strand wire between the fixed jaws forming a bend or crimp in each strand wire midway between the stays to provide for expansion and contraction. The crimping of the strand wires is simultaneous with the attaching of a stay to the strand wires and completes the fence; and, as the drum with the coiler or twister heads and the crimpers continues its advance revolution or travel, the strand wires and the stays will be carried forward until the point is reached where the crimpers and the coiler or twister heads commence their descending movement, and during such descending movement the strand wires will escape from the crimping jaws and from the slots of the coiler or twister heads and their journal boxes or bearings, leaving the fence clear to pass under the roller 160 and wind onto the spool of the reel.

The descent of the roller 130 in the inclined slot or trackway 131, reverses the endwise travel of the rack-bar 126, and such reversed movement of the rack bar, through the pinions 125, reverses the rotation of the coiler or twister heads and returns the heads to normal position with the slots in line to receive thereinto the strand wires as a series of coiler or twister heads approach the horizontal position for their acting ends; and the movable arms or jaws of the crimpers are returned to normal position by the passage of the roller 155 into the opposite inclined portion 157 of the trackway or slot, and during the passage of the roller 155 in the straight portions 156 of the trackway or slot the rack bar 150 is held at rest and no movement of the arms or jaws of the crimper takes place.

The strand wires, in the construction shown, are continuously advanced by the upward travel of the drum carrying the coiler or twister heads and the winding of the completed fence on the reel, but other feed mechanisms could be used for advancing the wires simultaneously with the advance of the stay wires by their feed wheels, so that, as regards the feed of the strand and stay wires, the machine will be continuously operative. After the machine is once threaded up and the first sectional stay applied to the strand wires, the further operation of applying the stays to the strand wires will be automatic; and the operation can be continued until the required amount of fence has been produced, as, after a reel is full, it can be removed and a new reel placed on the shaft to be filled, and so on until the amount of complete fencing required has been wound on reels or taken care of in some other manner. The roller 160 is to have a sufficient depression below the upper line of travel of the carrier drum to furnish the inclination necessary for withdrawal of the strand wires from the coiler or twister heads, such withdrawal occurring at the point of contact of the common tangent of the drum and roller. The curve of each stay section, after being severed, will be straightened by the action of the coiler or twister heads in winding or coiling the ends of the stay sections around each other and around the strand wires, making, when the union is completed, a straight transverse sectional stay united to the strand wires.

The parts are so timed that the feed wheels advance the required length of stay wire for a section of a stay during the period of time that the carrier or drum is raising each successive series of coiler or twister heads into operative position; and the sections of the stay are severed at the feed wheels by the cutters and advanced and delivered over the acting ends of a series of coiler or twister heads, when the acting ends are in a horizontal plane during which time the strand wires are continuously advancing for spacing apart the stays on the strand wires.

The several mechanisms have a continuous operation from the start of the machine as the coiling of the ends of the stay sections around the strand wires and the crimping of the strand wires are both attained while the carrier or drum is advancing the series of coiler or twister heads, over the acting end of which the sections of a stay have been delivered.

It will thus be seen that the machine, as a whole, has a continuous operation after once threaded and started and that the various mechanisms operate to perform their respective work automatically and without interruption in the continuous feed of the strand wires and the stay wires; and the completed fence has a continuous wind on the reel without interfering with the operation of the mechanisms for coiling or winding the ends of the stay sections around the strand wires, nor interfering with the operation of the crimpers by which the strand wires are bent or crimped between the stays, nor interfering with the operation of the feed wheels and the cutters, by which the stay wires are continuously advanced.

The machine is of a construction in which the several mechanisms thereof have a co-operating and coacting relation and by which the attachment of the sectional stays to the strand wires is made effective while the completed fence is wound onto the reel therefor.

What I claim as new and desire to secure by Letters Patent is:

1. In a wire fence machine, a revoluble support, end coiling devices mounted in a longitudinal row on said support and operating to coil the overlapping ends of the sections of a transverse stay around the strand wires, and means carried by said support and movable longitudinally beneath the end coiling devices and operative within the support to give the end coilers a forward and backward rotation of equal duration with each complete revolution of the support, substantially as described.

2. In a wire fence machine, a revoluble support, end coiling devices arranged in parallel rows on the support and adapted to receive strand wires and operating to coil the overlapping ends of the sections of a transverse stay around the strand wires, and means in coacting relation to said support for feeding the sections of the transverse stay to the support and in operative relation to the end coilers, substantially as described.

3. In a wire fence machine, a revoluble support, several sets or rows of end coilers mounted on the support, each end coiler adapted to receive a strand wire, means in coacting relation to said support for feeding the sections of a transverse stay to the support during the movement of the latter, and means for operating the end coilers to connect the transverse stay to the strand wires by coiling the overlapping ends of the stay sections transversely around the strand wires, said means operative to give the end coilers a forward and backward rotation of equal duration with each complete revolution of the support, substantially as described.

4. In a wire fence machine, a revoluble drum, means on the drum for continuously drawing the strand or running wires of the fence fabric circumferentially over said drum, and end coilers mounted on said drum in position to receive said strand or running wires and operating to coil the overlapping ends of the sections of a transverse stay around the strand or running wires, uniting the stay sections with the strand or running wires and extending longitudinally of the drum, substantially as described.

5. In a wire fence machine, a revoluble drum, means on the drum for continuously drawing the strand or running wires of the fence fabric circumferentially over said drum, end coilers mounted on said drum in position to receive said strand or running wires and operating to coil the overlapping ends of the sections of a transverse stay around the strand or running wires, uniting the stay sections with the strand or running wires and extending longitudinally of the drum, a reel for the completed fence and operating to draw the strand or running wires of the fence over and away from said drum, and means for continuously driving said drum and reel, substantially as described.

6. In a wire fence machine, a revoluble drum, end coilers mounted on the surface of the drum and in rows around the drum and also longitudinally of the drum and operating to coil the overlapping ends of the sections of a transverse stay around the strand wires, mechanism carried by the drum and movable longitudinally beneath the end coilers adapted to actuate the rows of end coilers in succession and at predetermined intervals, giving the end coilers a forward and backward rotation of equal duration with each complete revolution of the drum, and means for inaugurating the movement of the coiler actuating mechanism at the same point in the travel of the coilers, substantially as described.

7. In a wire fence machine, a revoluble drum, end coilers mounted on the surface of the drum and in rows around the drum and also longitudinally of the drum and operating to coil the overlapping ends of the sections of a transverse stay around the strand wires, and means inaugurating the forward and backward rotation of the end coilers of each longitudinal row of coilers at the same point in their circumferential travel, making a rotation forward and backward of equal duration for the end coilers with each complete revolution of the drum, substantially as described.

8. In a wire fence machine, a revoluble drum, slotted end coilers, each coiler having a slotted drive wheel thereon, the end coilers mounted in rows around the drum and also longitudinally of the drum and operating to coil the overlapping ends of the sections of a transverse stay around the strand wires, and means for inaugurating the forward and backward rotation of the end coilers of each longitudinal row of coilers at the same point in their circumferential travel, making a rotation forward and backward of equal duration for the end coilers with each complete revolution of the drum, substantially as described.

9. In a wire fence machine, a revoluble drum, slotted end coilers, each coiler having a slotted drive wheel thereon, the end coilers mounted in rows around the drum and also longitudinally of the drum and operating to coil the overlapping ends of the sections of a transverse stay around the strand wires, and mechanism disposed beneath each row of end coilers and in mesh with the drive wheels of the entire row of coilers and adapted at a given point in the movement of the drum to be moved longitudinally for imparting a forward and backward rotation of equal duration to the end coilers with each complete revolution of the drum, substantially as described.

10. In a wire fence machine, a revoluble drum, means on the drum for drawing the strand or running wires of the fence fabric circumferentially over said drum, and end coilers mounted on said drum in position to receive the strand or running wires of the fence fabric and engage the overlapping ends of the sections of a transverse stay and coil the ends around the strand or running wires, uniting the transverse stays longitudinally on the drum with the strand or running wires, substantially as described.

11. In a wire fence machine, a revoluble drum, means on the drum for drawing the strand or running wires of the fence fabric circumferentially over said drum, end coilers mounted on said drum in position to receive the strand or running wires of the fence fabric and engage the overlapping ends of the sections of a transverse stay and coil the ends around the strand or running wires, uniting the transverse stays longitudinally on the drum with the strand or running wires, a reel at the rear of the drum for drawing the completed fabric and the strand or running wires of the fence fabric over and away from said drum, and a single means for driving said drum and reel, substantially as described.

12. In a wire fence machine, the combination of a stationary shaft, a revoluble drum comprising a head revolubly mounted on said shaft at or near each end thereof, and a series of longitudinal bars attached to said heads, end coilers mounted in rows on said longitudinal bars and operating to coil the overlapping ends of the sections of a transverse stay around the strand wires, and means carried by said bars and movable longitudinally beneath the end coilers adapted to actuate said end coilers at predetermined intervals to give the end coilers a forward and backward rotation of equal duration with each complete revolution of the drum, substantially as described.

13. In a wire fence machine, the combination of a stationary shaft, a revoluble drum comprising a head revolubly mounted on said shaft at or near each end thereof, a series of longitudinal bars attached to said heads, end coilers mounted in rows on said longitudinal bars and operating to coil the overlapping ends of the sections of a transverse stay around the strand wires, means carried by said bars and movable longitudinally beneath the end coilers adapted to actuate said end coilers at predetermined intervals to give the end coilers a forward and backward rotation of equal duration with each complete revolution of the drum, and means for inaugurating the movement of the end coiler operating mechanism at the same point in the travel of the row of end coilers around with the drum for the forward and backward rotation of equal duration, substantially as described.

14. In a wire fence machine, a revoluble fence forming drum, end coiling mechanism mounted thereon and operating through the movement thereof to coil the overlapping ends of the sections of a transverse stay around the strand wires, a reel for drawing the strand or running wires of the fence fabric about and away from said drum, and means for revolving both the drum and reel, substantially as described.

15. In a wire fence machine, a fence forming revoluble drum having at intervals longitudinally extending rows of supporting brackets, each bracket formed of a pair of oppositely located slotted plates, a longitudinally movable rack-bar mounted in each longitudinal row of supporting brackets, an end coiler having a slotted and toothed wheel mounted in each pair of supporting brackets and in mesh with said rack-bar, the end coilers operating to coil the overlapping ends of the sections of a transverse stay around the strand wires, and means for actuating said rack-bar, substantially as described.

16. In a wire fence machine, a fence forming revoluble drum having at intervals longitudinally movable rack-bars, end coilers, each end coiler having a slotted wheel and mounted in mesh with said rack-bars, the end coilers operating to coil the overlapping ends of the sections of a transverse stay around the strand wires, and means for actuating said rack-bars in succession as the drum is revolved, substantially as described.

17. In a wire fence machine, a revoluble fence forming drum, end coiling mechanism mounted thereon and operative to coil the overlapping ends of the sections of a transverse stay around the strand wires, a reel for drawing the running wires of the fabric about and away from said drum, and a single means for revolving both the drum and the reel, substantially as described.

18. In a wire fence machine, a fence forming revoluble drum having at intervals longitudinally extending rows of supporting brackets, each bracket formed with a pair of oppositely located slotted plates, a longitudinally movable rack-bar, an end coiler having a slotted and toothed wheel and mounted in each bracket in mesh with said rack-bar, each end coiler operating to coil the overlapping ends of the sections of a transverse stay around the strand wires, and means for actuating said rack bar during the movement of the drum, to give the end coilers a forward and backward rotation of equal duration with each complete revolution of the drum, substantially as described.

19. In a wire fence machine, a fence forming revoluble drum having at intervals longitudinally movable rack-bars, end coilers, each end coiler having a slotted wheel mounted in mesh with said rack-bars, the end coilers operating to coil the overlapping ends of the sections of a transverse stay around the strand wires, and means for actuating said rack-bars in succession while the drum is in motion, and operating to give the end coilers a forward and backward rotation of equal duration with each complete revolution of the drum, substantially as described.

20. In a wire fence machine, the combination of a revoluble frame, a plurality of end coilers arranged in a plurality of rows on said frame adapted to retain and advance a series of strand wires and operating to coil the overlapping ends of the sections of the transverse stay around the strand wires, and means for feeding the sections of the transverse stay in position to the end coilers of each row as they successively follow each other in the movement of the revoluble drum, substantially as described.

21. In a wire fence machine, the combination of a revoluble frame, several sets of end coilers mounted on said frame and adapted to receive and advance strand wires and operating to coil the overlapping ends of the sections of a transverse stay around the strand wires, and means for feeding the sections of the transverse stay in position to each set of end coilers as they successively follow each other in the movement of the frame, substantially as described.

22. In a wire fence machine, the combination of a revoluble frame, a series of rows of end coiling devices arranged on said frame and operating to coil the overlapping ends of the sections of a transverse stay around the strand wires, power devices engaging the end coilers of each independent row, and means for imparting movement to said power devices at given points in the movement of said frame for rotating the end coilers of each row forward and backward in succession with each complete revolution of the frame, substantially as described.

23. In a wire fence machine, the combination of a revoluble frame, end coiling devices journaled in said frame and disposed in longitudinal rows on the frame and operating to coil the overlapping ends of the sections of a transverse stay around the strand wires, and rack-bars longitudinally supported on said frame and adapted to actuate said end coiling devices and give said end coiling devices a forward and backward rotation of equal duration with each complete revolution of the frame, substantially as described.

24. In a wire fence machine, the combination of a revoluble frame, end coilers mounted on the surface of the frame and in rows around the frame and also longitudinally of the frame and operating to coil the overlapping ends of the sections of a transverse stay around the strand wires, and a rack-bar in mesh with the end coilers of each longitudinal row, adapted to actuate their respective rows of end coilers in succession and give the end coilers a forward and backward rotation of equal duration with each complete revolution of the frame, substantially as described.

25. In a wire fence machine, the combination of a revoluble frame, end coilers mounted on the surface of the frame and in rows around the frame and also longitudinally of the frame and operating to coil the overlapping ends of the sections of a transverse stay around the strand wires, a rack-bar in mesh with the end coilers of each longitudinal row, adapted to actuate their respective rows of end coilers in succession and give the end coilers a forward and backward rotation of equal duration with each complete revolution of the frame, and means for inaugurating the movement of the successive rack-bars at the same points in their travel to facilitate in the actuation of the end coilers for an equal duration of forward and backward rotation, substantially as described.

26. In a wire fence machine, the combination of a revoluble frame, a series of slotted end coiler supporting brackets, a rack-bar longitudinally movable through each row of brackets, a slotted end coiler revolubly mounted in each bracket and in mesh with said rack-bar and operating to coil the overlapping ends of the sections of a transverse stay around the strand wires, and means operating at given points in the rotation of the frame for reciprocating the rack-bars and thereby rotating the end coilers forward and backward for an equal duration of travel with each complete revolution of the frame, substantially as described.

27. In a wire fence machine, the combination of a stationary shaft, a revoluble frame comprising supports mounted on said shaft to rotate thereon, a series of end coilers mounted in circumferential rows on said supports and operating to coil the overlapping ends of the sections of a transverse stay around the strand wires, a series of longitudinally movable rack-bars on said supports, and means for inaugurating the movement of each succeeding rack-bar at the same points in their travel to give the end coilers a forward and backward rotation of equal duration with each complete revolution of the frame, substantially as described.

28. A wire fence machine, comprising a revolving frame and a series of end coiling devices carried thereby, the arrangement of the frame and end coilers being such that as the frame is revolved the end coilers will be actuated to coil the overlapping ends of the sections of a transverse stay around the strand wires the width of the fence fabric, substantially as described.

29. A machine for the manufacture of wire fabric, comprising a revolving frame, means for feeding the individual sections of a transverse stay to said frame, and end coiling devices for engaging the ends of the sections of said transverse stay, said end coilers arranged to revolve in directions different from the rotation of said frame for interlocking the transverse stay to strand wires by coiling the overlapping ends of the stay sections around the strand wires during the rotation of the revolving frame, substantially as described.

30. A machine for the manufacture of wire fabric, comprising a revolving frame, means for feeding strand wires and loose sections of a transverse stay to said frame, and end coiling devices for engaging the ends of the stay sections and coiling the same transversely around the strand wires as the coiling devices successively move into the path of the wires during the rotation of the frame, said end coiling devices arranged to revolve in directions different from the rotation of said frame for intercoiling the ends of the stay sections around the strand wires and delivering a finished fence fabric during the rotation of the frame, substantially as described.

31. In a machine for making wire fabric, the combination with a rotary support, of means for advancing a series of strand or line wires, means for feeding the sections of a transverse stay across the strand or line wires, and mechanism for connecting the sections of a transverse stay and the line wires, said mechanism including an end coiler mounted on and revoluble with the support and adapted to coil the overlapping ends of the sections of the transverse stay upon a strand or line wire, substantially as described.

32. In a machine for making wire fabric, the combination with a rotary support, of means for guiding a series of strand or line wires over the support, means for feeding the sections of a transverse stay across the strand or line wires, and wire connecting mechanism including a circumferential series of end coilers carried by the rotary support and moving in the same plane to connect successive transverse stays to a trand or line wire by coiling the overlapping ends of the sections of the transverse stays around the strand or line wires, substantially as described.

33. A wire fence machine, comprising a rotary frame, a series of end coilers arranged in rows across and circumferentially upon said frame and operating to coil the overlapping ends of the sections of a transverse stay around the strand wires, and means for actuating said end coilers during the rotation of the frame to simultaneously and successively operate a row of end coilers and give the end coilers a forward and backward rotation of equal duration with each complete rotation of the frame, substantially as described.

34. A wire fence machine, comprising a rotary frame, end coiling devices carried thereby for engaging a series of strand wires and transverse stay wires and arranged and operating to interlock or twist the overlapping ends of the sections of the transverse stay around the strand wires and form a square mesh during the rotation of the frame, substantially as described.

35. In combination, a rotary frame, wire connecting mechanism mounted thereon and including end coiling devices for connecting sectional transverse stays to margin strand wires and intermediate strand or line wires by coiling the overlapping ends of the sections of the transverse stay around the margin and intermediate strand or line wires, and a stationary cam located within the frame and operatively related to the wire connection mechanism to operate and give the end coilers a forward and backward rotation of equal duration with each complete rotation of the frame, substantially as described.

36. In combination, a rotary drum, wire connecting mechanism mounted thereon and including end coilers for connecting sectional stays to margin wires and intermediate line wires by coiling the overlapping ends of the sections of each transverse stay around the margin and intermediate strand or line wires, means for causing a plurality of wires to move with the drum, and a fixed cam located within the drum and operatively related to the wire connecting mechanism and actuating the same as the drum rotates to give the end coilers a forward and backward rotation of equal duration and thereby effect the connection of the stays in transit, substantially as described.

37. In a machine for making wire fence fabric, the combination with a rotary drum, of wire connecting mechanism mounted thereon and operative to coil the overlapping ends of the sections of a transverse stay around margin and intermediate strand or line wires, means for continuously feeding forward a plurality of margin and intermediate strand or line wires in operative proximity to the wire connecting mechanism, means for feeding the sections of the transverse stays across the moving wires and in position for the overlapping ends of the sections of each transverse stay to be engaged by the wire connecting mechanism, and a stationary cam located within the drum and operatively located to the wire connecting mechanism to operate the same during the movements of the wires and connect the stays to said wires by coiling and intercoiling the overlapping ends around the wires, substantially as described.

38. In a machine for making wire fabric, the combination of a rotary drum equipped with a set of end coilers operating to coil the overlapping ends of the sections of a transverse stay around the strand or line wires, means for advancing a plurality of strand or line wires with the end coilers, and means for moving the sections of a transverse stay sidewise to present the overlapping ends of the stay sections to the strand or line wires and to the acting end of the end coilers, substantially as described.

39. In a machine for making wire fabric, the combination with a rotary drum, of two circumferential series of end coilers mounted on the drum and operating to coil the overlapping ends of the sections of a transverse stay around the strand or line wires, means for guiding a strand or line wire to each series of end coilers, and means for guiding the sections of a transverse stay to corresponding end coilers of both series for the overlapping ends of the stay sections to be coiled thereby upon both strand or line wires, substantially as described.

40. In a machine for making wire fabric, the combination with a rotary drum equipped with several sets of end coilers, each set of end coilers operating to coil the overlapping ends of the sections of a transverse stay around the strand or line wires, means for leading the strand or line wires to the end coilers, means for severing the wires for the sections of a transverse stay, and means for leading the previously severed sections of the transverse stay to the strand or line wires, substantially as described.

41. In a machine for making wire fabric, the combination of a rotary drum equipped with several sets of end coilers, each set of end coilers operating to coil the overlapping ends of the sections of a transverse stay around the strand or line wires, means for leading the strand or line wires to the end coilers, and a stay carrier associated with the drum and operative to deliver the sections of the transverse stay in position for the operation of the end coilers in coiling the overlapping ends of the stay sections around the strand or line wires, substantially as described.

42. In a machine for making wire fence, the combination of a rotary drum equipped with several sets of wire connecting mechanisms, each set of wire connecting mechanism operative to coil the overlapping ends of the sections of a transverse stay around the strand or line wires, means for leading the strand or line wires to the drum, and a stay carrier associated with said drum and operating to deliver the sections of the transverse stays in engaging position for a set of wire connecting mechanism to coil the ends of the stay sections around the strand or line wires, substantially as described.

43. In a machine for making wire fabric, the combination with a rotary drum, of several corresponding sets of end coilers movable with the drum, each set of end coilers operative to coil the overlapping ends of the sections of the transverse stays around the strand or line wires, means for leading the strand or line wires to the end coilers, and a stay carrier associated with the drum and operative to deliver the sections of the transverse stays in position for their overlapping ends to be engaged by the end coilers and coiled around the strand or line wires, substantially as described.

44. In combination, a stationary support, a drum rotatable thereon, wire connecting mechanism mounted on the drum and operative to coil the overlapping ends of the sections of transverse stays around a plurality of strand wires, means for causing a plurality of strand wires to move with the drum, and operating mechanism including a cam mounted on the axial support and operatively related to the wire connecting mechanism for giving the wire connecting mechanism a forward and backward rotation of equal duration with each complete rotation of the drum, substantially as described.

45. In combination, a stationary shaft, a hollow rotary drum having heads journaled on the shaft, wire connecting mechanism exposed upon the periphery of the drum and movable with the latter and operative to coil the overlapping ends of the sections of transverse stays around a plurality of strand wires, and stationary operating mechanism mounted upon the fixed shaft and within the hollow drum and operating to give the wire connecting mechanism a forward and backward rotation of equal duration with each complete rotation of the hollow drum, substantially as described.

46. In combination, a hollow rotary drum, wire connecting mechanism mounted thereon and operative to coil the overlapping ends of the sections of transverse stays around a plurality of strand wires, means for feeding the sections of the transverse stays to said wire connecting mechanism in position for the overlapping ends of the stay sections to be engaged by the wire connecting mechanism, and operating mechanism completely housed within the drum and arranged to operate the wire connecting mechanism to effect the connection of the stay sections with the strand wires during the travel of the wire connecting mechanism, substantially as described.

47. In a machine for making wire fabric, the combination with a rotary weaving drum, of means for leading a plurality of strand or line wires thereto, and a stay carrier coöperating with the drum and operating to deliver the sections of a transverse stay to the strand or line wires, substantially as described.

48. In a wire fence machine, the combination of a rotary weaving head, rows of end coilers mounted thereon, the end coilers operating to coil the overlapping ends of the sections of a transverse stay around the strand wires, and means for feeding the sections of the transverse stay in position to the end coilers with the ends of each stay section overlapping adjacent strand wires, the rotary weaving head having a circular travel in unison with the strand wires during the coiling operation of the ends of the stay sections around the strand wires, substantially as described.

49. A wire fence machine, comprising a rotating frame, and a series of rows of end coiling devices suitably arranged on said frame, each row of end coilers successively actuated during the rotation of said frame for coiling the overlapping ends of the sections of a transverse stay around the strand wires and continuously uniting together the strand wires and the transverse stay sections by engaging the overlapping ends of the stay sections with the end coilers, substantially as described.

50. A wire fence machine, comprising a rotating frame, a series of rows of end coiling devices suitably arranged on said frame, each row of end coilers successively actuated during the rotation of said frame for coiling the overlapping ends of the sections of a transverse stay around the strand wires and continuously uniting together the overlapping ends of the stay sections with the end coilers, and mechanism arranged in such manner that as the frame is rotated one or more rows of the series of end coilers will be actuated to give a forward and backward rotation of equal duration during the complete rotation of the frame, substantially as described.

51. A wire fence machine, comprising a rotating frame, a series of rows of end coiling devices suitably arranged on said frame, each row of end coilers successively actuated during the rotation of said frame for coiling the overlapping ends of the sections of a transverse stay around the strand wires and continuously uniting together the strand wires and the transverse stay sections by engaging the overlapping ends of the stay sections with the end coilers, power devices engaging each independent row of end coilers and operating to give the end coilers a forward and backward rotation of equal duration, and means engaged by said power devices for intermittently actuating each successive row of end coilers in a forward and backward direction, substantially as described.

52. A wire fence machine, comprising a rotating frame, a series of rows of end coiling devices arranged in said frame, each row of end coiling devices operative to coil the overlapping ends of the sections of a transverse stay around the strand wires, and power devices coacting with each row of end coilers during the rotation of said frame and arranged in a manner to engage and actuate a row of end coilers in a forward and backward direction when moved into the path of the power devices, substantially as described.

53. In a wire fence machine, a fence forming drum, means for holding the strand or running wires of the fence fabric circumferentially on said drum, and end coilers mounted on said drum and operated during the movement thereof to unite the strand or running wires with transverse stays extending longitudinally of the drum, each transverse stay consisting of sections and the end coilers operating to coil the overlapping ends of the stay sections transversely around the strand or running wires, substantially as described.

54. In a wire fence machine, a fence forming drum having at intervals longitudinally movable rack-bars, and coilers having wheels mounted in mesh with said rack-bars, said end coilers operating to coil the overlapping ends of the sections of a transverse stay around the strand wires, and a single means for actuating said rack-bars and returning the same successively as the drum is revolved, giving the end coilers a forward and backward rotation of equal duration with each complete revolution of the drum, substantially as described.

55. In a wire fence machine, a fence forming drum having at intervals longitudinally movable rack-bars, end coilers having wheels mounted in mesh with said rack-bars, said end coilers operating to coil the overlapping ends of the sections of a transverse stay around the strand wires, a single means for actuating said rack-bars and returning the same successively as the drum is revolved, giving the end coilers a forward and backward rotation of equal duration with each complete revolution of the drum, and means for limiting the forward and backward movement of said rack-bars, substantially as described.

56. In a wire fence machine, a fence forming drum, longitudinally movable rack-bars, end coilers, each end coiler having a wheel mounted in mesh with said rack-bars, and means for revolving the drum and actuating the rack-bars while the drum is in motion to give the end coilers a forward and backward rotation of equal duration with each complete revolution of the drum, substantially as described.

57. In a wire fence machine, a fence forming drum, longitudinally movable rack-bars, slotted end coilers each with a driving wheel mounted in mesh with said rack-bars, and means for actuating said rack-bars and returning the same successively while the drum is in motion, for giving the end coilers a forward and backward rotation of equal duration with each complete revolution of the drum, substantially as described.

58. In a wire fence machine, a fence forming drum, longitudinally movable rack-bars, slotted end coilers each with a driving wheel mounted in mesh with said rack-bars, means for actuating said rack-bars and returning the same successively while the drum is in motion, for giving the end coilers a forward and backward rotation of equal duration with each complete revolution of the drum, and means for limiting the actuating and return movement of said rack-bars, substantially as described.

59. In a wire fence machine, a fence forming drum, means for holding the running wires of the fence fabric circumferentially on said drum, and end coilers mounted on said drum for uniting the strand or running wires with sectional stays extending longitudinally of the drum, by coiling the overlapping ends of the sections of the transverse stays around the strand or running wires, substantially as described.

60. In a wire fence machine, a fence forming drum having at intervals longitudinally movable rack-bars, slotted end coilers, each having a driving wheel mounted in mesh with said rack-bars, the end coilers operating to coil the overlapping ends of the sections of a transverse stay around the strand wires, and a single means for both revolving the drum and actuating the rack-bars, to give the end coilers a forward and backward rotation of equal duration with each complete revolution of the drum, substantially as described.

61. In combination, a hollow drum, wire connecting mechanism exposed on the exterior thereof, said mechanism operating to coil the overlapping ends of the sections of a transverse stay around the strand wires, and operating mechanism located within the hollow drum and arranged to operate the wire connecting mechanism and give the same a forward and backward rotation of equal duration with each complete revolution of the hollow drum, substantially as described.

62. In a machine for making wire fabric, the combination with a weaving drum, of weaving mechanism mounted thereon and arranged to be operated by the movement of the drum, said mechanism operating to coil the overlapping ends of the sections of a transverse stay around a plurality of strand wires, substantially as described.

63. A device of the class described, comprising a stationary shaft, a series of supports revoluble on said shaft, revolving end coiling devices mounted on said supports and operating to coil the overlapping ends of the sections of a transverse stay around the strand wires, means longitudinally movable through said supports and coacting with said end coiling devices for intermittently rotating said end coiling devices during the rotation of the supports and giving the end coilers a forward and backward rotation of equal duration with each complete revolution of the supports, substantially as described.

64. In a wire fence machine, the combination of a stationary shaft, supports mounted and revoluble on said shaft, and revoluble end coiling devices journaled in said supports and having their axes disposed in line with the travel of the wires fed thereto and operating to coil the overlapping ends of the sections of a transverse stay around the strand wires, substantially as described.

65. In a machine for making wire fabric, the combination with a traveling end coiler, said end coiler adapted to operate and coil the overlapping ends of the sections of a transverse stay around the strand wires, of means for rotating the end coiler in different directions during its travel, said means operating to give the end coiler a forward and backward rotation of equal duration for the end coiler to operate and coil the overlapping ends of the sections of a transverse stay around the strand wires, substantially as described.

66. In a machine for making wire fabric, the combination with a traveling end coiler, said end coiler adapted to operate and coil the overlapping ends of the sections of a transverse stay around the strand wires, of a reciprocating rack geared thereto, and a cam arranged to reciprocate the rack to rotate the end coiler in opposite directions during its travel, said means operating to give the end coilers a forward and backward rotation of equal duration for the end coilers to operate and coil the overlapping ends of the sections of the transverse stay around the strand wires, substantially as described.

67. In a machine for making wire fabric, the combination with an end coiler mounted to travel in an endless orbit, said end coiler adapted to operate and coil the overlapping ends of the sections of a transverse stay around the strand wires, of a rack geared to the end coiler, and means for reciprocating the rack to rotate the end coiler in opposite directions during the travel thereof, said means operating to give the end coiler a forward and backward rotation of equal duration for the end coiler to operate and coil the overlapping ends of the sections of the transverse stay around the strand wires, substantially as described.

68. In a machine for making wire fabric, the combination with a rotary end coiler mounted to travel in an endless orbit, said end coiler adapted to operate and coil the overlapping ends of the sections of a transverse stay around the strand wires, of a rack geared thereto, and a fixed cam operatively related to the rack to reciprocate the same during the travel of the end coiler, the geared rack and fixed cam operating to give the end coiler a forward and backward rotation of equal duration for the end coilers to operate and coil the overlapping ends of the sections of the transverse stay around the strand wires, substantially as described.

69. In a machine for making wire fabric, wire connecting mechanism movable in an endless orbit and including a series of end coiling devices extending across the width of the fabric, said end coiling devices operating to coil the overlapping ends of the sections of a transverse stay around the strand wires, means for feeding a plurality of wires to the wire connecting mechanism, and means inclosed within the orbit of movement of the wire connecting mechanism to operate the same during the orbital travel, said means operating to give the end coiling devices a forward and backward rotation of equal duration with each complete orbital travel of the wire connecting mechanism, substantially as described.

70. In a machine for making wire fabric, the combination with wire connecting mechanism traveling in an endless orbit, said mechanism operating to coil the overlapping ends of the sections of a transverse stay around the strand wires, means for feeding the sections of the transverse stay across margin wires and line wires, means for continuously feeding a plurality of margin and intermediate line wires, and stationary operating mechanism inclosed by the orbit of movement of the wire connecting mechanism and arranged to operate the same to coil and intercoil the ends of the sections of the transverse stay around the moving wires, substantially as described.

71. In a machine for making wire fabric, the combination with wire connecting mechanism moving in an endless orbit, said mechanism adapted to operate and coil the overlapping ends of the sections of a transverse stay around the strand or line wires, means for leading a plurality of strand or line wires to said mechanism, and a stay carrier movable to present the sections of the transverse stay to the wire connecting mechanism in position for said mechanism to engage and coil the overlapping ends of the stay sections transversely around the strand or line wires, substantially as described.

72. In combination, means for continuously advancing a plurality of strand or line wires, means for advancing the sections of a transverse stay across the strand or line wires during the advance of the latter, and wire connecting mechanism movable with the strand or line wires in the direction of the feed thereof and operative during such movement to effect the interlocking of the strand or line wires and the sections of the transverse stay at their point of intersection, the interlock engagement at each point of intersection being produced by coiling the overlapping ends of the stay sections transversely around the strand or line wires for the coil to surround the strand or line wires, substantially as described.

73. In a machine for making wire fabric, the combination with means for continuously advancing a series of strand or line wires, means for feeding forward a plurality of wires for a transverse stay, means for severing the wires for the stay into sections, means for moving the sections of the transverse stay with the line wires after severance, and means for interweaving the transverse stay with the strand or line wires during the advance of the latter, said means operating to coil the overlapping ends of the sections of the transverse stay around the strand or line wires, thereby interweaving the transverse stay with the strand or line wires, substantially as described.

74. In a machine for making wire fabric, the combination with means for continuously advancing a plurality of strand or line wires, means for severing a plurality of wires to form the sections of a transverse stay, and means mounted to travel with the strand or line wires and operating during such travel to interweave the transverse stay with the several strand or line wires by coiling the overlapping ends of the sections of the transverse stay around the strand or line wires, substantially as described.

75. In a machine for making wire fabric, the combination with means for advancing a plurality of strand or line wires, means operating during the advance of the strand or line wires to position the sections of a transverse stay, and a plurality of end coilers for coiling the overlapping ends of the sections of the transverse stay around the different strand or line wires, substantially as described.

76. In a machine for making wire fabric, the combination with means for continuously advancing a series of strand or line wires, means for continuously advancing a plurality of wires for a transverse stay, means for severing the stay wires into sections of the transverse stay, means for feeding the severed sections of the transverse stay across the strand or line wires during the advance of the latter, and means operating subsequent to the severance of the sections of the transverse stay and during the advance of the line wires to coil the opposite ends of the sections of the transverse stay around the outside strand or line wires and around the intermediate strand or line wires, substantially as described.

77. In a machine for making wire fabric, means for continuously advancing a series of strand or line wires, means located outside of said series of strand or line wires for feeding the sections of a transverse stay across said wires, and means for effecting an interlocking connection of the sections of the transverse stay with certain or all of the line wires by coiling the overlapping ends of the sections of the transverse stay around the strand or line wires, substantially as described.

78. In a loom adapted to produce a wire fabric from a plurality of continuously moving wires, a support movable with the wires, and several rows of end coiling devices mounted on and movable with said support and operating during such movement to connect the wires at intervals by coiling the ends of the sections of a transverse wire around the strand wires, substantially as described.

79. In a wire fence machine the combination of a series of carrying rails, rows of end coilers mounted on said rails and operating to coil the overlapping ends of the sections of a transverse stay around the strand wires, and means for feeding a series of stay wire sections to the heads of the end coilers, with the ends of each stay wire section overlapping adjacent strand wires, the rails and the heads of the end coilers having a travel in unison with the strand wires during the coiling of the overlapping ends of the stay sections on the strand wires, substantially as described.

80. In a wire fence machine, the combination of a series of carrying rails, rows of end coiler heads mounted on said rails, and means for feeding a series of stay wire sections to the end coiler heads, with the ends of each stay wire section overlapping adjacent strand wires, the rails and the end coiler heads having an endless travel in unison with the strand wires during the coiling of the overlapping ends of the stay wire sections around the strand wires, substantially as described.

81. In a wire fence machine, the combination of a series of carrying rails, rows of end coiler heads mounted on said rails, and means for feeding a series of stay wire sections to the end coiler heads with the ends of each stay wire section overlapping adjacent strand wires, the rails and the end coiler heads having a circular travel in unison with the strand wires during the coiling of the overlapping ends of the stay wire sections around the strand wires, substantially as described.

82. In a wire fence machine, a revoluble carrier over which the strand wires lead, end coiling devices mounted in a longitudinal row on said carrier and operating to coil the overlapping ends of the sections of a transverse stay around the strand wires, and means on said carrier and operative within the carrier to give the end coilers a forward and backward rotation of equal duration with each complete revolution of the carrier, substantially as described.

83. In a wire fence machine, a revoluble carrier over which a plurality of strand wires lead and by which the strand wires are continuously advanced, a series of rows of end coiling devices, each row extending longitudinally of the revoluble carrier, the end coiling devices of each row operating to coil the overlapping ends of the sections of a transverse stay around the strand wires, a plurality of power devices mounted on the carrier, one power device for and engaging with each longitudinal row of end coilers for giving the end coilers a forward and backward rotation of equal duration with each complete revolution of the revoluble carrier, substantially as described.

84. In a wire fence machine, a revoluble carrier over which a plurality of strand wires lead, and a series of end coiling devices mounted on and revoluble with the carrier, the end coiling devices operating to coil the overlapping ends of the sections of a transverse stay around the strand wires, the arrangement of the carrier and the end coiling devices being such that, as the carrier is revolved, the end coiling devices will be actuated to transversely wind the ends of the sections of the transverse stay around the strand wires the width of the fence fabric, substantially as described.

85. In a wire fence machine, a revoluble carrier over which a plurality of strand wires lead, a series of end coiling devices mounted on and revoluble with the carrier arranged in rows across and circumferentially upon said carrier, the end coiling devices operating to coil the overlapping ends of the sections of a transverse stay around the strand wires, and means for actuating said end coilers forward and backward an equal distance of rotation during a complete revolution of the carrier and to simultaneously and successively operate the coilers of each row of end coilers, substantially as described.

86. In a wire fence machine, the combination of a revoluble carrier, means mounted on the carrier and operative to feed forward a plurality of strand wires as the carrier revolves, means for advancing a plurality of sections for a transverse stay across the strand wires as the strand wires advance, and mechanism connecting the ends of the stay sections to the strand wires, said mechanism including a longitudinal series of end coilers, one coiler for each strand wire, each series advancing in unison with the strand wires and the end coilers of each series operating to coil the overlapping ends of the sections of the transverse stay around the strand wires, substantially as described.

87. In a wire fence machine, the combination of a revoluble carrier, means mounted on the carrier and operative to feed forward a plurality of strand wires as the carrier revolves, means for advancing a plurality of sections for a transverse stay across the strand wires as the strand wires advance, and mechanism connecting the ends of the stay sections to the strand wires, said mechanism including a plurality of circumferential and longitudinal series of end coilers, one coiler for each strand wire, each series advancing in unison with the strand wires and the end coilers of each series operating to coil the overlapping ends of the sections of the transverse stay around the strand wires, substantially as described.

88. In a wire fence machine, the combination of a revoluble carrier for continuously advancing a plurality of strand wires, means for advancing and delivering a plurality of sections of a transverse stay across the strand wires, a wire connecting mechanism mounted on the carrier and movable with the strand wires in the direction of the feed thereof, said wire connecting mechanism comprising a plurality of end coilers arranged in a row longitudinally of the carrier, each end coiler having given thereto a forward and backward rotation of equal duration with each complete revolution of the carrier, said wire connecting mechanism operative during the forward rotation of the end coilers to effect an interlocking of the stay sections on the strand wires at the points of intersection, said interlock engagement at each point of intersection being produced by transversely coiling the overlapping ends of the stay sections around the strand wires, substantially as described.

89. In a wire fence machine, the combination of a revoluble carrier, means on the carrier for engaging and continuously advancing a plurality of strand wires, means for advancing and delivering a plurality of sections of a transverse stay across the strand wires, a wire connecting mechanism mounted on the carrier and movable with the strand wires in the direction of the feed thereof, said wire connecting mechanism comprising a plurality of end coilers arranged in a row longitudinally of the carrier, each end coiler having given thereto a forward and backward rotation of equal duration with each complete revolution of the carrier, said wire connecting mechanism operative during the forward rotation of the end coilers to effect an interlocking of the stay sections on the strand wires at the points of intersection, said interlock engagement at each point of intersection being produced by transversely coiling the overlapping ends of the stay sections around the strand wires, means for giving the end coilers their forward and backward rotation, said means including a cam fixedly mounted within the carrier in operative relation to the wire connecting mechanism, substantially as described.

90. In a wire fence machine, the combination of a revoluble hollow carrier for continuously advancing a plurality of strand wires, means for advancing and delivering a plurality of stay sections across the strand wires, and wire connecting mechanism mounted on the carrier and movable with the strand wires in the direction of the feed thereof, said wire connecting mechanism comprising a plurality of end coilers arranged in a row longitudinally of the carrier, each end coiler having its acting end exposed on the exterior of the carrier and having given thereto a forward and backward rotation of equal duration with each complete revolution of the carrier, said wire connecting mechanism operative during the forward rotation of the end coilers to effect an interlocking of the stay sections on the strand wires at the points of intersection, said interlock engagement at each point of intersection being produced by transversely coiling the overlapping ends of the stay sections around the strand wires, substantially as described.

91. In a wire fence machine, the combination of a revoluble hollow carrier for continuously advancing a plurality of strand wires, means for advancing and delivering a plurality of stay sections across the strand wires, wire connecting mechanism mounted on the carrier and movable with the strand wires in the direction of the feed thereof, said wire connecting mechanism comprising a plurality of end coilers arranged in a row longitudinally of the carrier, each end coiler having its acting end exposed on the exterior of the carrier and having given thereto a forward and backward rotation of equal duration with each complete revolution of the carrier, said wire connecting mechanism operative during the forward rotation of the end coilers to effect an interlocking of the stay sections on the strand wires at the points of intersection, said interlock engagement at each point of intersection being produced by transversely coiling the overlapping ends of the stay sections around the strand wires, and an operating mechanism located within the hollow carrier for giving the end coilers their forward and backward rotation, substantially as described.

92. In a wire fence machine, the combination of a revoluble hollow carrier for continuously advancing a plurality of strand wires, means for advancing and delivering a plurality of stay sections across the strand wires, wire connecting mechanism mounted on the carrier and movable with the strand wires in the direction of the feed thereof, said wire connecting mechanism comprising a plurality of end coilers arranged in a row longitudinally of the carrier, each end coiler having its acting end exposed on the exterior of the carrier and having given thereto a forward and backward rotation of equal duration with each complete revolution of the carrier, said wire connecting mechanism operative during the forward rotation of the end coilers to effect an interlocking of the stay sections on the strand wires at the points of intersection, said interlock engagement at each point of intersection being produced by transversely coiling the overlapping ends of the stay sections around the strand wires, and a stationary operating mechanism located within the hollow carrier for giving the end coilers their forward and backward rotation, substantially as described.

93. In a wire fence machine, the combination of a revoluble carrier over which the strand wires lead, mechanism on the carrier for continuously feeding forward a plurality of strand wires, a plurality of end coiler heads arranged in series and mounted on the revoluble carrier, each series comprising a number of end coiler heads corresponding to the number of strand wires, and each end coiler head having a longitudinal slot for the passage of the strand wire to the center of the end coiler head, and each coiler head having an acting end face to engage and coil the overlapping ends of the sections of a transverse stay around the strand wires, a pinion for each coiler head of a series, a rack-bar common to all of the pinions of a series of end coiler heads, and means for reciprocating each rack-bar and simultaneously revolving the end coiler heads of each series as the carrier travels forward, substantially as described.

94. In a wire fence machine, the combination of a revoluble carrier over which the strand wires lead, mechanism on the carrier for continuously feeding forward a plurality of strand wires, a plurality of end coiler heads arranged in series and mounted on the revoluble carrier, each series comprising a number of end coiler heads corresponding to the number of strand wires, and each end coiler head having a longitudinal slot for the passage of the strand wire to the center of the end coiler head, and each coiler head having an acting end face to engage and coil the overlapping ends of the sections of a transverse stay around the strand wires, a pinion for each coiler head of a series, a rack-bar common to all of the pinions of a series of end coiler heads, a roller on each rack-bar, and an inclined trackway receiving the rollers of the rack-bars for reciprocating the rack-bars and revolving the coiler heads in opposite directions, substantially as described.

95. In a wire fence machine, the combination of a fixed shaft, a continuously revoluble carrier mounted on the fixed shaft and over and by which a plurality of strand wires are continuously advanced, a plurality of coiling mechanisms mounted on and revoluble with the carrier and arranged in series, each series comprising a plurality of coiler heads and each coiler head having an acting end face to engage the overlapping ends of the sections of a transverse stay and coil the overlapping ends of the stay sections around the strand wires, a pinion for each end coiler head, a rack-bar common to all the pinions of a series of end coiler heads, and means operative from the revolving of the carrier to reciprocate the rack-bars and successively actuate the different series of coiler heads forward and backward an equal distance of rotation, substantially as described.

96. In a wire fence machine, the combination of a continuously revoluble carrier over and by which a plurality of strand wires are continuously advanced, a plurality of coiling mechanisms mounted on and revoluble with the carrier and arranged in series, each series comprising a plurality of coiler heads and each coiler head having an acting end face to engage the overlapping ends of the sections of a transverse stay and coil the overlapping ends of the stay sections around the strand wires, a pinion for each end coiler head, a rack-bar common to all the pinions of a series of end coiler heads, and means operative from the revolving of the carrier to reciprocate the rack-bars and successively actuate the different series of coiler heads forward and backward an equal distance of rotation, substantially as described.

97. In a wire fence machine, the combination of a continuously revoluble carrier over and by which a plurality of strand wires are continuously advanced, a plurality of coiling mechanisms mounted on and revoluble with the carrier and arranged in series, each series comprising a plurality of coiler heads and each coiler head having an acting end face to engage the overlapping ends of the sections of a transverse stay and coil the overlapping ends of the stay sections around the strand wires, a pinion for each end coiler head, a rack-bar common to all the pinions of a series of end coiler heads, a roller on each rack-bar, and a drum having a fixed position within the carrier and provided with an inclined slot to receive the rollers of the rack-bars, for the travel of each roller up and down in the trackway formed by the slot with the revolving of the carrier to reciprocate each rack-bar and operate the end coiler heads forward and backward to an equal duration of rotation with the complete revolution of the carrier, substantially as described.

98. In a wire fence machine, the combination of a continuously revoluble carrier over which a plurality of strand wires lead and by which the strand wires are continuously advanced, a plurality of coiling mechanisms mounted on and revolving with the carrier and arranged in series longitudinally of the carrier, each series comprising a plurality of end coilers corresponding to the number of strand wires, and each end coiler having a longitudinal slot for the passage of the strand wire to the center of the end coiler and each end coiler having an acting end to engage the overlapping ends of the sections of a transverse stay and coil the ends of the sections transversely around the strand wires, mechanism for simultaneously actuating the end coilers of a series and giving each end coiler a forward and backward rotation of equal duration with each complete revolution of the carrier, a roller at the rear of and below the upper traveling surface of the carrier and common to all of the strand wires and under which the completed fence and the strand wires pass, and operating to strip the completed fence and the strand wires from the carrier at the point of departure, when released from the end coiler heads, and means for spooling the completed fence, said means located rearward of the roller, substantially as described.

99. In a wire fence machine, the combination of a continuously revoluble carrier over which a plurality of strand wires lead and by which the strand wires are continuously advanced, a plurality of coiling mechanisms mounted on and revolving with the carrier and arranged in series longitudinally of the carrier, each series comprising a plurality of end coilers corresponding to the number of strand wires, and each end coiler having a longitudinal slot for the passage of the strand wire to the center of the end coiler and each end coiler having an acting end to engage the overlapping ends of the sections of a transverse stay and coil the ends of the sections transversely around the strand wires, mechanism for simultaneously actuating the end coilers of a series and giving each end coiler a forward and backward rotation of equal duration with each complete revolution of the carrier, a roller at the rear of and below the upper traveling surface of the carrier and common to all of the strand wires and under which the completed fence and the strand wires pass, and operating to strip the completed fence and the strand wires from the carrier at the point of departure, when released from the end coiler heads, and a reel onto which the completed fence is wound and by which, in conjunction with the continuously revolving carrier, the strand wires are given a continuous forward feed, substantially as described.

100. In a wire fence machine, the combination of a continuously revoluble carrier over which a plurality of strand wires lead and by which the strand wires are continuously advanced, a plurality of coiling mechanisms mounted on and revolving with the carrier and arranged in series longitudinally of the carrier, each series comprising a plurality of end coilers corresponding to the number of strand wires, and each end coiler having a longitudinal slot for the passage of the strand wire to the center of the end coiler and each end coiler having an acting end to engage the overlapping ends of the sections of a transverse stay and coil the ends of the sections transversely around the strand wires, mechanism for simultaneously actuating the end coilers of a series and giving each end coiler a forward and backward rotation of equal duration with each complete revolution of the carrier; a roller at the rear of and below the upper traveling surface of the carrier and common to all of the strand wires and under which the completed fence and the strand wires pass, and operating to strip the completed fence and the strand wires from the carrier at the point of departure, when released from the end coiler heads, a reel onto which the completed fence is wound and by which, in conjunction with the continuously revolving carrier, the strand wires are given a continuous forward feed, and a take-up mechanism coöperating with the reel, as the roll of fence increases in size, for maintaining the proper drive of the reel, substantially as described.

101. In a wire fence machine, the combination of mechanism for continuously feeding forward a plurality of strand wires, a revoluble carrier over which the strand wires lead, mechanism for continuously feeding forward a plurality of stay wires, and mechanism for severing the advanced portion of each stay wire to form a section of a transverse stay crossing the plurality of strand wires, substantially as described.

102. In a wire fence machine, the combination of mechanism for continuously feeding forward a plurality of strand wires, a revoluble carrier over which the strand wires lead, mechanism for continuously feeding forward a plurality of stay wires, mechanism for severing the advanced portion of each stay wire to form a section of a transverse stay crossing the plurality of strand wires, and means for carrying forward and delivering the sections of the stay into position for coiling their ends around the strand wires, substantially as described.

103. In a wire fence machine, the combination of mechanism for continuously feeding forward a plurality of strand wires, a revoluble carrier over which the strand wires lead, mechanism for continuously feeding forward a plurality of stay wires, mechanism for severing the advanced portion of each stay wire to form a section of a transverse stay crossing the plurality of strand wires, means for carrying forward and delivering the sections of the stay into position for coiling their ends around the strand wires, and a series of coiler heads mounted on the revoluble carrier and over the acting ends of which the sections of the stay are delivered, substantially as described.

104. In a wire fence machine, the combination of mechanism for continuously feeding forward a plurality of strand wires, a revoluble carrier over which the strand wires lead, mechanism for continuously feeding forward a plurality of stay wires, mechanism for severing the advanced portion of each stay wire to form a section of a transverse stay crossing the plurality of strand wires, means for carrying forward and delivering the sections of the stay into position for coiling their ends around the strand wires, a series of coiler heads mounted on the revoluble carrier and over the acting ends of which the sections of the stay are delivered, and means for revolving the series of coiler heads simultaneously for coiling the ends of the sections of the stay around the strand wires, substantially as described.

105. In a wire fence machine, the combination of mechanism for continuously feeding forward a plurality of strand wires, a revoluble carrier over which the strand wires lead, mechanism for continuously feeding forward a plurality of stay wires, mechanism for severing the advanced portion of each stay wire to form a section of a transverse stay crossing the plurality of strand wires, means for carrying forward and delivering the sections of the stay into position for coiling their ends around the strand wires, a series of coiler heads mounted on the revoluble carrier and over the acting ends of which the sections of the stay are delivered, means for coiling the ends of the sections of the stay around the strand wires, and means for crimping the strand wires between the stays, substantially as described.

106. In a wire fence machine, the combination of mechanism for continuously feeding forward a plurality of strand wires, a revoluble carrier over which the strand wires lead, a plurality of coiler heads arranged in series and mounted on the revoluble carrier, each series comprising a number of coiler heads corresponding to the number of strand wires, and each coiler head having a longitudinal slot for the passage of the strand wire to the center of the coiler head, a pinion for each coiler head of a series, a rack-bar common to all the pinions of a series of coiler heads, means for reciprocating the rack-bar and simultaneously revolving the coiler heads of each series as the carrier travels forward, and means for crimping the strand wires, substantially as described.

107. In a wire fence machine, the combination of mechanism for continuously feeding forward a plurality of strand wires, a revoluble carrier over which the strand wires lead, a plurality of coiler heads arranged in series and mounted on the revoluble carrier, each series comprising a number of coiler heads corresponding to the number of strand wires, and each coiler head having a longitudinal slot for the passage of the strand wire to the center of the coiler head, means for simultaneously revolving the coiler heads of each series as the carrier travels forward, a crimping mechanism consisting of a series of fixed jaws and a series of movable jaws supported on the revoluble carrier, each movable jaw having a segmental rack, a reciprocating rack-bar engaging the segmental racks, a roller on the rack-bar, and a trackway receiving the roller and operating with the passage of the roller therein to reciprocate the rack-bar and operate the movable jaw of each crimper, substantially as described.

108. In a wire fence machine, the combination of mechanism for continuously feeding forward a plurality of strand wires, a revoluble carrier over which the strand wires lead, a plurality of coiler heads arranged in series and mounted on the revoluble carrier, each series comprising a number of coiler heads corresponding to the number of strand wires, and each coiler head having a longitudinal slot for the passage of the strand wire to the center of the coiler head, a pinion for each coiler head of the series, a rack-bar engaging the pinions of all the coiler heads of the series, a roller on the rack-bar, an inclined trackway receiving the roller for reciprocating the rack-bar and revolving the coiler heads in opposite directions, a crimping mechanism consisting of a series of fixed jaws and a series of movable jaws supported on the revoluble carrier, each movable jaw having a segmental rack, a reciprocating rack-bar engaging the segmental racks, a roller on the rack-bar, and a trackway receiving the roller and operating with the passage of the roller therein to reciprocate the rack-bar and operate the movable arm of each crimper, substantially as described.

109. In a wire fence machine, the combination of mechanism for continuously feeding forward a plurality of strand wires, a continuously revoluble carrier over which the strand wires lead, mechanism for continuously feeding forward a plurality of stay wires, said mechanism consisting of a series of feed wheels arranged in pairs and a cutter for each feed wheel of the series arranged for the cutters to operate and sever the leading end portion of each stay wire when projected the distance to furnish a section of transverse stay crossing the space between two adjoining strand wires, and means for simultaneously driving all of the feed wheels, substantially as described.

110. In a wire fence machine, the combination of mechanism for continuously feeding forward a plurality of strand wires, a continuously revoluble carrier over which the strand wires lead, mechanism for continuously feeding forward a plurality of stay wires, said mechanism consisting of a series of feed wheels arranged in pairs and a cutter for each feed wheel of the series arranged for the cutters to operate and sever the leading end portion of each stay wire when projected the distance to furnish a section of transverse stay crossing the space between two adjoining strand wires, means for simultaneously driving all of the feed wheels, and means for advancing the severed section of each stay and delivering the same to a coiling mechanism mounted on the revoluble carrier, substantially as described.

111. In a wire fence machine, the combination of mechansism for continuously feeding forward a plurality of strand wires, a continuously revoluble carrier over which the strand wires lead, mechanism for continuously feeding forward a plurality of stay wires, said mechanism consisting of a series of feed wheels arranged in pairs and a cutter for each feed wheel of the series arranged for the cutters to operate and sever the leading end portion of each stay wire when projected the distance to furnish a section of transverse stay crossing the space between two adjoining strand wires, means for simultaneously driving all of the feed wheels, a fixed support over which the severed section of the stay passes, a movable support receiving the severed section of the stay, and means for actuating the movable support to advance the severed stay section and deliver the same to a coiling mechanism mounted on the revoluble carrier, substantially as described.

112. In a wire fence machine, the combination of mechanism for continuously feeding forward a plurality of strand wires, a continuously revoluble carrier over which the strand wires lead, mechanism for continuously feeding forward a plurality of stay wires, said mechanism consisting of a series of feed wheels arranged in pairs and a cutter for each feed wheel of the series arranged for the cutters to operate and sever the leading end portion of each stay wire when projected the distance to furnish a section of a transverse stay crossing the space between two adjoining strand wires, means for simultaneously driving all of the feed wheels, a series of fixed supports over which the severed sections of the stay pass, a series of movable supports receiving the severed sections of the stay, means for actuating the movable supports to simultaneously advance the severed stay sections and deliver the same to a coiling mechanism mounted on the revoluble carrier, and a series of coiler heads constituting the coiling mechanism and mounted on the revoluble carrier and operating with the advance of the revoluble carrier and the strand wires to coil the ends of the stay sections around the strand wires, substantially as described.

113. In a wire fence machine, the combination of mechanism for continuously feeding forward a plurality of strand wires, a continuously revoluble carrier over which the strand wires lead, a plurality of coiling mechanisms mounted on and revoluble with the carrier, and mechanism for continuously feeding forward a plurality of stay wires simultaneously with the travel of the strand wires, substantially as described.

114. In a wire fence machine, the combination of a mechanism for continuously feeding forward a plurality of strand wires, a continuously revoluble carrier over which the strand wires lead, a plurality of coiling mechanisms mounted on and revoluble with the carrier, mechanism for continuously feeding forward a plurality of stay wires simultaneous with the travel of the strand wires, and means coöperating with the feeding mechanism for the stay wires and operating to sever the advanced portion of each stay wire into a section of a transverse stay crossing the plurality of strand wires, substantially as described.

115. In a wire fence machine, the combination of mechanism for continuously feeding forward a plurality of strand wires, a continuously revoluble carrier over which the strand wires lead, a plurality of coiling mechanisms mounted on and revoluble with the carrier, mechanism for continuously feeding forward a plurality of stay wires simultaneously with the travel of the strand wires, means coöperating with the feeding mechanism for the stay wires and operating to sever the advanced portion of each stay wire into a section of a transverse stay crossing the plurality of strand wires, and a movable support for each severed section of the stay operating to carry forward and deliver the stay sections into position over a coiling mechanism on the carrier for the ends of the stay sections to be coiled around the strand wires, substantially as described.

116. In a wire fence machine, the combination of mechanism for continuously feeding forward a plurality of strand wires, a continuously revoluble carrier over which the strand wires lead, and a plurality of crimping mechanisms mounted on the revoluble carrier and operating to crimp the strand wires at stated intervals, substantially as described.

117. In a wire fence machine, the combination of mechanism for continuously feeding forward a plurality of strand wires, a continuously revoluble carrier over which the strand wires lead, and a plurality of crimping mechanisms mounted on the revoluble carrier, the crimping mechanisms arranged in series, each series consisting of a plurality of fixed jaws receiving the strand wires and a movable jaw, and means for operating the movable jaws to engage and crimp the strand wire at regular intervals, substantially as described.

118. In a wire fence machine, the combination of mechanism for continuously feeding forward a plurality of strand wires, a continuously revoluble carrier over which the strand wires lead, and a plurality of crimping mechanisms mounted on the revoluble carrier, the crimping mechanisms arranged in series, each series consisting of a plurality of fixed jaws receiving the strand wires and a movable jaw, each movable jaw having at its base end a segmental rack, a rack bar common to all of the segmental racks, and means for reciprocating the rack-bar, substantially as described.

119. In a wire fence machine, the combination of mechanism for continuously feeding forward a plurality of strand wires, a continuously revoluble carrier over which the strand wires lead, and a plurality of crimping mechanisms mounted on the revoluble carrier, the crimping mechanisms arranged in series, each series consisting of a plurality of fixed jaws receiving the strand wires and a movable jaw, each movable jaw having at its base end a segmental rack, a rack-bar common to all of the segmental racks, a roller fixed on the rack-bar, a drum having a fixed relation within the revoluble carrier and provided with a slot forming a trackway to receive the roller, for the travel of the roller around the trackway with the revolving of the carrier to reciprocate the rack bar and operate the movable jaws, substantially as described.

120. In a wire fence machine, the combination of mechanism for continuously feeding forward a plurality of strand wires, a continuously revoluble carrier over which the strand wires lead, a plurality of coiling mechanisms mounted on and revoluble with the carrier, each coiling mechanism consisting of a plurality of coiler heads arranged in series, and each coiler head having a longitudinal slot for the passage of a strand wire to the center of the coiler head, means for operating each series of coiler heads as the carrier revolves, a plurality of crimping mechanisms mounted on and revoluble with the carrier, each crimping mechanism consisting of a plurality of fixed jaws and movable jaws arranged in series, and means for operating the movable jaws of each series of crimpers as the carrier revolves, substantially as described.

121. In a wire fence machine, the combination of mechanism for continuously feeding forward a plurality of strand wires, a continuously revoluble carrier over which the strand wires lead, a plurality of coiling mechanisms mounted on and revoluble with the carrier, each coiling mechanism consisting of a plurality of coiler heads arranged in series, and each coiler head having a longitudinal slot for the passage of a strand wire to the center of the coiler head, a driving pinion for each coiler head, a rack bar common to all the pinions of a series, means for reciprocating the rack-bars as the carrier revolves, a plurality of crimping mechanisms mounted on and revoluble with the carrier, each crimping mechanism consisting of a plurality of fixed jaws and movable jaws arranged in series, each movable jaw having a segmental rack, a rack-bar common to the segmental racks of all the movable crimper jaws of a series, and means for reciprocating the rack-bars as the carrier revolves, substantially as described.

122. In a wire fence machine, the combination of mechanism for continuously feeding forward a plurality of strand wires, a continuously revoluble carrier over which the strand wires lead, a plurality of coiling mechanisms mounted on and revoluble with the carrier, each coiling mechanism consisting of a plurality of coiler heads arranged in series, each coiler head having a longitudinal slot for the passage of a strand wire to the center of the coiler head, a driving pinion for each coiler head, a rack-bar common to the pinions of all the coiler heads of a series, a roller on each rack-bar, a drum located within the revoluble carrier and provided with an inclined slot forming a trackway receiving the rollers for the travel of the rollers around the trackway as the carrier revolves to reciprocate the rack bars, a plurality of crimping mechanisms mounted on and revoluble with the carrier, each crimping mechanism consisting of a plurality of fixed jaws and movable jaws arranged in series, each movable jaw having a segmental rack, a rack bar common to the segmental racks of all the movable crimper jaws of a series, a roller on each rack bar, and a drum within the revoluble carrier and provided with a slot forming a trackway receiving the rollers for the travel of the rollers around the trackway as the carrier revolves to reciprocate the rack bars and operate the movable jaws of a series of crimpers, substantially as described.

123. In a wire fence machine, the combination of mechanism for continuously feeding forward a plurality of strand wires, a continuously revoluble carrier over which the strand wires lead, mechanism for continuously feeding forward a plurality of stay wires, said mechanism consisting of a plurality of feed wheels arranged in pairs and continuously revoluble, each pair operating to advance a stay wire, a cutter on each feed wheel, each cutter having a fixed relation on its feed wheel and both cutters conjointly operating to sever the projected portion of each stay wire into a stay section adapted to span the space between two strand wires, a fixed bearing for one wheel of each pair of feed wheels, a yieldable bearing for the companion wheel of each pair of feed wheels for regulating the bite of the feed wheels on the stay wires, and means for simultaneously driving all of the feed wheels, substantially as described.

124. In a wire fence machine, the combination of mechanism for continuously feeding forward a plurality of strand wires, a continuously revoluble carrier over which the strand wires lead, mechanism for continuously feeding forward a plurality of stay wires, said mechanism consisting of a plurality of feed wheels arranged in pairs and continuously revoluble, each pair operating to advance a stay wire, a cutter on each feed wheel, each cutter having a fixed relation on its feed wheel and both cutters conjointly operating to sever the projected portion of each stay wire into a stay section adapted to span the space between two strand wires, a fixed bearing for one wheel of each pair of feed wheels, a yieldable bearing for the companion wheel of each pair of feed wheels for regulating the bite of the feed wheels on the stay wires, means for simultaneously driving all of the feed wheels, and a slidable grip for each feed wheel, the two grips operating to clasp the leading end of a stay wire and hold the leading end after the severance of a section by the cutters of the feed wheels, substantially as described.

125. In a wire fence machine, the combination of a plurality of feed wheels arranged in pairs and operating to advance a plurality of stay wires, a cutter on each feed wheel operating to sever the projected portion of each stay wire into a stay section adapted to span the space between two strand wires, a fixed support in advance of the feed wheels receiving the severed section of a stay, a movable support adjacent to the fixed support and engaging the severed stay section, and means for advancing the movable support to carry the severed section of the stay forward and deliver the section over a coiling mechanism, substantially as described.

126. In a wire fence machine, the combination of a plurality of feed wheels arranged in pairs and operating to advance a plurality of stay wires, a cutter on each feed wheel operating to sever the projected portion of each stay wire into a stay section adapted to span the space between two strand wires, a fixed support in advance of each pair of feed wheels receiving the severed section of a stay, a movable support adjacent to each fixed support and engaging the severed stay section, an oscillating arm for each movable support, a journal pin for each oscillating arm, an oscillating arm on each journal pin, a link for each last named oscillating arm, a rock shaft common to all the links and having the links connected therewith, an arm on the rock shaft, and a cam engaging the arm of the rock shaft for advancing the movable support, substantially as described.

127. In a wire fence machine, the combination of a plurality of feed wheels arranged in pairs and operating to advance a plurality of stay wires, a cutter on each feed wheel operating to sever the projected portion of each stay wire into a stay section adapted to span the space between two strand wires, a fixed support in advance of each pair of feed wheels receiving the severed section of a stay, a movable support adjacent to each fixed support and engaging the severed stay section, an oscillating arm carrying each movable support, a journal pin for each oscillating arm, an oscillating arm on each journal pin, a link for each last named oscillating arm, a rock shaft common to all the links and having the links connected therewith, an arm on the rock shaft, a revoluble cam engaging the arm of the rock shaft for advancing all of the movable supports, and a spring connected with the arm of the rock shaft for returning all of the movable supports to normal position, substantially as described.

128. In a wire fence machine, the combination of a plurality of feed wheels arranged in pairs and continuously revoluble to advance a plurality of stay wires, each pair operating to advance a stay wire, a cutter on each feed wheel, each cutter having a fixed relation on its feed wheel and both cutters conjointly operating to sever the projected portion of each stay wire into a stay section adapted to span the space between two strand wires, a fixed bearing for one wheel of each pair of feed wheels, a yieldable bearing for the companion wheel of each pair of feed wheels for regulating the bite of the feed wheels on the stay wires, a plunger for each feed wheel, each plunger having a projected acting end to engage the stay wire, and each plunger being yieldably held in its advanced position, a fixed support in advance of the feed wheels receiving the severed section of a stay, a movable support adjacent to the fixed support and engaging the severed stay section, and means for advancing the movable support to carry the severed section of the stay forward and deliver the section over a coiling mechanism, substantially as described.

129. In a wire fence machine, the combination of a plurality of feed wheels arranged in pairs and continuously revoluble, each pair operating to advance a stay wire, a cutter on each feed wheel, each cutter having a fixed relation on its feed wheel and both cutters conjointly operating to sever the projected portion of each stay wire into a stay section adapted to span the space between two strand wires, a fixed bearing for one wheel of each pair of feed wheels, a yieldable bearing for the companion wheel of each pair of feed wheels for regulating the bite of the feed wheels on the stay wires, a plunger for each feed wheel, each plunger having a projecting acting end to engage the stay wire, a stem for each plunger located within the body of the feed wheel, a coiled spring around the stem and engaging the head of the plunger for holding the plunger in projected operative position and allowing the acting end of the plunger to recede as the feed wheels pass each other in revolving, a fixed support in advance of the feed wheels receiving the severed section of a stay wire, a movable support adjacent to the fixed support and engaging the severed stay section, an oscillating arm for each movable support, a journal pin for each oscillating arm, an oscillating arm on each journal pin, a link for each last-named oscillating arm, a rock shaft common to all the links and having the links connected therewith, an arm on the rock shaft, and a cam engaging the arm of the rock shaft for advancing the movable support, substantially as described.

130. In a wire fence machine, the combination of mechanism for feeding forward a plurality of stay wires, means for severing the advanced portion of each stay wire into a section of a stay adapted to span the space between two strand wires, means for supporting the advanced end of each stay section, means for delivering each severed section of the stay to a coiling mechanism, a coiling mechanism consisting of a plurality of coiler heads, one coiler head for each strand wire, and a revoluble carrier on which the coiler heads are mounted and by which the coiler heads pass from a horizontal to an elevated position during the operation of coiling the ends of the stay sections around the strand wires and discharging the completed fence, substantially as described.

131. In a wire fence machine, the combination of mechanism for feeding forward a plurality of stay wires, means for severing the advance portion of each stay wire into a section of a stay adapted to span the space between two strand wires, means for supporting the advance end of each stay section, means for delivering each severed section of the stay to a coiling mechanism, a coiling mechanism consisting of a plurality of coiler heads, one coiler head for each strand wire, a crimping mechanism operating to crimp the strand wires between the stays, and a carrier on which the coiling mechanism and the crimping mechanism are mounted and by which the coiler heads and the crimpers pass from a horizontal to an inclined position during the operation of coiling the ends of the stay sections around the strand wires, crimping the strand wires and discharging the completed fence, substantially as described.

132. In a wire fence machine, the combination of mechanism for continuously advancing a plurality of strand wires, mechanism for continuously advancing and at the proper time severing a plurality of stay wires into sections of a stay, means for delivering the severed stay sections to a coiling mechanism, a coiling mechanism consisting of a series of coiler heads, each head having a longitudinal slot receiving thereinto a strand wire, a continuously revoluble carrier on which the coiler heads are mounted, means for rotating the coiler heads of each series successively to coil the ends of the stay sections around the strand wires, and means for disposing of the completed fence, substantially as described.

133. In a wire fence machine, the combination of mechanism for continuously advancing a plurality of strand wires, mechanism for continuously advancing a plurality of stay wires, means for severing the stay wires into sections to form a transverse stay, means for delivering the severed sections of the transverse stay to a coiling mechanism, a coiling mechanism consisting of a series of coiler heads, each head having a longitudinal slot receiving thereinto a strand wire, a gripping mechanism consisting of a series of fixed jaws and a series of movable jaws, the fixed jaws each receiving a strand wire thereinto, a revoluble carrier on which the coiling mechanism and the gripping mechanism are mounted, means for simultaneously operating the several coiler heads of the coiling mechanism, means for operating the several movable jaws of the gripping mechanism, and a reel for receiving the completed fence, substantially as described.

134. In a wire fence machine, the combination of a series of carrying rails, rows of coiler heads mounted on said rails, and means for feeding a series of stay wire sections to the coiler heads, with the ends of each stay wire section overlapping adjacent strand wires, the rails and coiler heads having a travel in unison with the strand wires during the twisting and coiling of the stay wire sections thereon, substantially as described.

135. In a wire fence machine, the combination of a series of carrying rails, rows of coiler heads mounted on said rails, and means for feeding a series of stay wire sections to the coiler heads, with the ends of each stay wire section overlapping adjacent strand wires, the rails and coiler heads having an endless travel in unison with the strand wires during the twisting and coiling of the stay wire sections thereon, substantially as described.

136. In a wire fence machine, the combination of a series of carrying rails, rows of coiler heads mounted on said rails, and means for feeding a series of stay wire sections to the coiler heads, with the ends of each stay wire section overlapping adjacent strand wires, the rails and coiler heads having a circular travel in unison with the strand wires during the twisting and coiling of the stay wire sections thereon, substantially as described.

137. In a wire fence machine, the combination of a series of carrying rails, rows of coiler heads mounted on said rails, a second series of carrying rails, rows of strand wire grippers carried on said second series of rails, and means for feeding a series of stay wire sections to the coiler heads, with the ends of each stay wire section overlapping adjacent strand wires, both series of carrying rails having a travel in unison with the strand wires during the twisting and coiling of the stay wire sections thereon and the operation of the grippers, substantially as described.

138. In a wire fence machine, the combination of a series of carrying rails, rows of coiler heads mounted on said rails, a second series of carrying rails, rows of strand wire grippers carried on said second series of rails, and means for feeding a series of stay wire sections to the coiler heads, with the ends of each stay wire section overlapping adjacent strand wires, both series of carrying rails having an endless travel in unison with the strand wires, during the twisting and coiling of the stay wire sections thereon and the operation of the grippers, substantially as described.

139. In a wire fence machine, the combination of a series of carrying rails, rows of coiler heads mounted on said rails, a second series of carrying rails, rows of strand wire grippers carried on said second series of rails, and means for feeding a series of stay wire sections to the coiler heads, with the ends of each stay wire section overlapping adjacent strand wires, both series of carrying rails having a circular travel in unison with the strand wires, during the twisting and coiling of the stay wire sections thereon and the operation of the grippers, substantially as described.

140. In a wire fence machine, the combination of a series of carrying rails, rows of coiler heads mounted on said rails, a second series of carrying rails, rows of strand wire grippers carried on said second series of rails, and a plurality of movable carriers each adapted to deliver a stay wire section to the coiler heads, with the ends of each stay wire section overlapping adjacent strand wires, both of said series of carrying rails having an endless travel in unison with the strand wires, during the twisting and coiling of the stay wires thereon and the operation of the grippers, substantially as described.

141. In a wire fence machine, the combination of a series of carrying rails, rows of strand wire grippers carried on said rails, and a plurality of stay section carriers, each adapted to deliver a stay section to the coiler heads, with the ends of each stay section overlapping adjacent strand wires, the said carrying rails for the grippers having an endless travel in unison with the strand wires, during the twisting and coiling of the stay wire sections thereon and the operation of the grippers, substantially as described.

142. In a wire fence machine, the combination of a series of carrying rails, rows of coiler heads mounted on said rails, means for continuously feeding forward a plurality of stay wires, means for severing each stay wire into a stay section, and means for delivering each severed stay section to the coiler heads, with the ends of each stay section overlapping adjacent strand wires, the carrying rails and coiler heads having a travel in unison with the strand wires, during the coiling of the stay wire section thereon, substantially as described.

143. In a wire fence machine, the combination of a series of carrying rails, rows of coiler heads mounted on said rails, means for continuously feeding forward a plurality of stay wires, means for severing each stay wire into a stay section, means for delivering each severed stay section to the coiler heads, with the ends of each stay section overlapping adjacent strand wires, the carrying rails and coiler heads having a travel in unison with the strand wires, during the coiling of the stay wire section thereon, a second series of carrying rails, and strand wire grippers carried by the said second series of carrying rails, said second series of carrying rails having a travel in unison with the strand wires, during the operation of the grippers, substantially as described.

144. In a wire fence machine, the combination of mechanism for continuously feeding forward a plurality of strand wires, a continuously revoluble carrier over which the strand wires lead and by which the strand wires are continuously advanced, a plurality of coiler heads arranged in series and mounted on the revoluble carrier, each series comprising a number of coiler heads corresponding to the number of strand wires, and each coiler head having a longitudinal slot for the passage of the strand wire to the center of the coiler head, and having on its acting end means for engaging and coiling the end of a stay section around a strand wire, a pinion for each coiler head of a series, a rack-bar common to all of the pinions of a series of coiler heads, and means for reciprocating the rack-bar and simultaneously revolving the coiler heads of each series as the carrier travels forward, substantially as described.

145. In a wire fence machine, the combination of mechanism for continuously feeding forward a plurality of strand wires, a continuously revoluble carrier over which the strand wires lead and by which the strand wires are continuously advanced, a plurality of coiler heads arranged in series and mounted on the revoluble carrier, each series comprising a number of coiler heads corresponding to the number of strand wires, and each coiler head having a longitudinal slot for the passage of the strand wire to the center of the coiler head and having on its acting end means for engaging and coiling the end of a stay section around a strand wire, a pinion for each coiler head of the series, a rack-bar engaging the pinions of all the coiler heads of the series, a roller on the rack-bar, and an inclined trackway receiving the roller for reciprocating the rack bar and revolving the coiler heads in opposite directions, substantially as described.

146. In a wire fence machine, the combination of a fixed shaft, a continuously revoluble carrier mounted on the fixed shaft and over and by which a plurality of strand wires are continuously advanced, a plurality of coiling mechanisms mounted on and revoluble with the carrier and arranged in series, each series comprising a plurality of coiler heads, each coiler head having on its acting end means for engaging and coiling the end of a stay section around a strand-wire, a pinion for each coiler head, a rack bar common to all the pinions of a series of coiler heads, and means operative from the revolving of the carrier to reciprocate the rack-bars and successively actuate the different series of coiler heads, substantially as described.

147. In a wire fence machine, the combination of a continuously revoluble carrier over and by which a plurality of strand wires are continuously advanced, a plurality of coiling mechanisms mounted on and revoluble with the carrier and arranged in series, each series comprising a plurality of coiler heads, each coiler head having on its acting end means for engaging and coiling the end of a stay section around a strand wire, and each coiler head having a longitudinal slot for the passage of a strand wire to the center of a coiler head and each coiler head having thereon a driving pinion, a rack bar common to all of the pinions of a series of the coiler heads, and means for reciprocating the rack bar, substantially as described.

148. In a wire fence machine, the combination of a continuously revoluble carrier over and by which a plurality of strand wires are continuously advanced, a plurality of coiling mechanisms mounted on and revoluble with the carrier and arranged in series, each series comprising a plurality of coiler heads, each coiler head having on its acting end means for engaging and coiling the end of a stay section around a strand wire and each coiler head having a longitudinal slot for the passage of a strand wire to the center of a coiler head and each coiler head having thereon a driving pinion, a rack bar common to all of the pinions of a series of the coiler heads, a roller fixed on the rack bar, a drum having a fixed position within the carrier and provided with an inclined slot forming a trackway to receive the roller, for the travel of the roller up and down in the trackway with the revolving of the carrier to reciprocate the rack bar and operate the coiler heads, substantially as described.

149. In a wire fence machine, the combination of a continuously revoluble carrier over which a plurality of strand wires lead and by which the strand wires are continuously advanced, a plurality of coiling mechanisms mounted on and revoluble with the carrier and arranged in series longitudinally of the carrier, each series comprising a plurality of coiler or twister heads corresponding to the number of strand wires and each coiler or twister head having a longitudinal slot for the passage of a strand wire to the center of the coiler head and having on its acting end means for engaging and coiling the end of a stay section around a strand wire, mechanism for simultaneously actuating the coiler heads of a series, a guiding and stripping roller at the rear of and below the upper traveling surface of the carrier and common to all of the strand wires and under which the completed fence passes and is disengaged from the carrier, and means for spooling the completed fence, said means located rearward of the roller, substantially as described.

150. In a wire fence machine, the combination of a continuously revoluble carrier over which a plurality of strand wires lead and by which the strand wires are continuously advanced, a plurality of coiling mechanisms mounted on and revoluble with the carrier and arranged in series longitudinally of the carrier, each series comprising a plurality of coiler or twister heads corresponding to the number of strand wires and each coiler or twister head having a longitudinal slot for the passage of a strand wire to the center of the coiler head and having on its acting end means for engaging and coiling the end of a stay section around a strand wire, mechanism for simultaneously actuating the coiler heads of a series, a guiding and stripping roller at the rear of and below the upper traveling surface of the carrier and common to all of the strand wires and under which the completed fence passes and is disengaged from the carrier, and a reel onto which the completed fence is wound and by which in conjunction with the continuously revolving carrier the strand wires have a continuous forward feed, substantially as described.

151. In a wire fence machine, the combination of a continuously revoluble carrier over which a plurality of strand wires lead and by which the strand wires are continuously advanced, a plurality of coiling mechanisms mounted on and revoluble with the carrier and arranged in series longitudinally of the carrier, each series comprising a plurality of coiler or twister heads corresponding to the number of strand wires and each coiler or twister head having a longitudinal slot for the passage of a strand wire to the center of the coiler head and having on its acting end means for engaging and coiling the ends of a stay section around a strand wire, mechanism for simultaneously actuating the coiler heads of a series, a guiding and stripping roller at the rear of and below the upper traveling surface of the carrier and common to all of the strand wires and under which the completed fence passes and is disengaged from the carrier, a reel onto which the completed fence is wound and by which in conjunction with the continuously revolving carrier the strand wires have a continuous forward feed, and a take-up mechanism coöperating with the reel as the roll of fence increases in size to maintain the proper drive for the reel, substantially as described

JOSEPH M. DENNING.

Witnesses:
L. L. BARNUM,
J. L. MATTSON.